US008768794B2

(12) United States Patent
Dhakephalkar et al.

(10) Patent No.: US 8,768,794 B2
(45) Date of Patent: *Jul. 1, 2014

(54) ALLOCATION MANAGER

(75) Inventors: Abhijit Dhakephalkar, Hyderabad (IN); David Haimes, Belmont, CA (US); Arunesh C. Banerjee, Fremont, CA (US); Zeesha Currimbhoy, Mountain View, CA (US); Robert Zwiebach, San Mateo, CA (US); Rondy Ng, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 13/458,110

(22) Filed: Apr. 27, 2012

(65) Prior Publication Data

US 2013/0080299 A1 Mar. 28, 2013

Related U.S. Application Data

(60) Provisional application No. 61/539,083, filed on Sep. 26, 2011.

(51) Int. Cl.
*G07B 17/00* (2006.01)
*G06Q 30/00* (2012.01)
*G06Q 40/00* (2012.01)
*G06Q 20/20* (2012.01)

(52) U.S. Cl.
CPC .............. *G06Q 40/12* (2013.01); *G06Q 20/204* (2013.01)
USPC ........................................ 705/30; 705/14.21

(58) Field of Classification Search
None
See application file for complete search history.

(56) References Cited

U.S. PATENT DOCUMENTS

| | | | |
|---|---|---|---|
| 6,397,195 B1 | 5/2002 | Pinard et al. | |
| 6,581,068 B1 | 6/2003 | Bensoussan et al. | |
| 2002/0111891 A1* | 8/2002 | Hoffman et al. | 705/36 |
| 2013/0080300 A1 | 3/2013 | Dhakephalkar et al. | |

OTHER PUBLICATIONS

U.S. Appl. No. 13/458,421, Non-Final Office Action mailed on Oct. 4, 2013, 18 pages.
U.S. Appl. No. 13/458,421, Notice of Allowance mailed on Dec. 17, 2013, 18 pages.

* cited by examiner

*Primary Examiner* — Ryan Zeender
*Assistant Examiner* — Denisse Oritz Roman
(74) *Attorney, Agent, or Firm* — Kilpatrick Townsend & Stockton LLP

(57) ABSTRACT

A method of using rules to execute periodic allocations of funds in a hierarchal accounting structure may include receiving an allocation rule, comprising a source account, a rule for determining a first amount, a parent account, and an allocation basis; accessing a multidimensional data cube comprising a hierarchal arrangement and aggregated balances for each level of the hierarchal arrangement; generating an allocation scenario by allocating the first amount to the aggregated balances for the one or more child accounts according to the allocation rule; generating one or more accounting journal entries corresponding to the allocation scenario; posting the one or more accounting journal entries to a general ledger associated with a relational database; and updating, using the relational database, the multidimensional data cube to reflect the allocation scenario.

20 Claims, 19 Drawing Sheets

FIG. 17

ALLOCATION MANAGER

CROSS-REFERENCES TO RELATED APPLICATIONS

The present application claims benefit under 35 USC 119 (e) of U.S. Provisional Application No. 61/539,083, filed on Sep. 26, 2011 by Dhakephalkar, and entitled "Allocation Manager," of which the entire disclosure is incorporated herein by reference for all purposes.

BACKGROUND

Modern enterprise software may include accounting applications to help monitor an organization's finances. The accounting applications may manage transactions and finances for the entire organization, or departments or subsidiaries within the organization. Accounting applications may also be used to manage complex accounting, inventory management, balance sheet and financial report generation, and any other financial details of the business. For large businesses, Enterprise Resource Planning software may be used, and may include functional modules such as accounts payable, accounts receivable, payroll, and trial balance.

Despite the size and power of Enterprise Resource Planning software, the limits of such software may be tested by the sheer volume of transactions it is forced to manage. For large organizations with many departments and/or subsidiaries, tens of thousands of transactions may take place every single day. Most often, transactions are entered into a journal by an accountant and/or data entry clerk. This requires many man-hours to keep the financial accounting system up to date. Furthermore, operator errors may result in small mistakes in the accounting system that are propagated into critical financial reports and balance statements. Therefore, there is a need in the art for improvements.

BRIEF SUMMARY

In one embodiment, a method of using rules to execute periodic allocations of funds in a hierarchal accounting structure is presented. The method may comprise receiving an allocation rule. In one embodiment, the allocation may comprise a source account, a rule for determining a first amount from the source account, a parent account; and an allocation basis that uses characteristics of one or more child accounts of the parent account to determine a proportion of the first amount to be allocated to the one or more child accounts. The method may also include accessing a multidimensional data cube. In one embodiment, the multidimensional data cube may comprise a hierarchal arrangement comprising the source account, the parent account, and the one or more child accounts; and aggregated balances for each level of the hierarchal arrangement. The method may additionally include generating an allocation scenario by allocating the first amount to the aggregated balances for the one or more child accounts according to the allocation rule, and generating one or more accounting journal entries corresponding to the allocation scenario. The method may further include posting the one or more accounting journal entries to a general ledger associated with a relational database; and updating, using the relational database, the multidimensional data cube to reflect the allocation scenario.

In another embodiment, a computer-readable memory having stored thereon a sequence of instructions is presented. The instructions, when executed by one or more processors, may cause the one or more processors to execute periodic allocations of funds in a hierarchal accounting structure by receiving an allocation rule. In one embodiment, the allocation may comprise a source account, a rule for determining a first amount from the source account, a parent account; and an allocation basis that uses characteristics of one or more child accounts of the parent account to determine a proportion of the first amount to be allocated to the one or more child accounts. The processor may also operate by accessing a multidimensional data cube. In one embodiment, the multidimensional data cube may comprise a hierarchal arrangement comprising the source account, the parent account, and the one or more child accounts; and aggregated balances for each level of the hierarchal arrangement. The processor may additionally operate by generating an allocation scenario by allocating the first amount to the aggregated balances for the one or more child accounts according to the allocation rule, and generating one or more accounting journal entries corresponding to the allocation scenario. The processor may further operate by posting the one or more accounting journal entries to a general ledger associated with a relational database; and updating, using the relational database, the multidimensional data cube to reflect the allocation scenario.

In yet another embodiment, a system is presented. The system may comprise a processor, and a memory communicatively coupled with and readable by the processor and having stored therein a sequence of instructions which, when executed by the processor, cause the processor to execute periodic allocations of funds in a hierarchal accounting structure by receiving an allocation rule. In one embodiment, the allocation may comprise a source account, a rule for determining a first amount from the source account, a parent account; and an allocation basis that uses characteristics of one or more child accounts of the parent account to determine a proportion of the first amount to be allocated to the one or more child accounts. The processor may also operate by accessing a multidimensional data cube. In one embodiment, the multidimensional data cube may comprise a hierarchal arrangement comprising the source account, the parent account, and the one or more child accounts; and aggregated balances for each level of the hierarchal arrangement. The processor may additionally operate by generating an allocation scenario by allocating the first amount to the aggregated balances for the one or more child accounts according to the allocation rule, and generating one or more accounting journal entries corresponding to the allocation scenario. The processor may further operate by posting the one or more accounting journal entries to a general ledger associated with a relational database; and updating, using the relational database, the multidimensional data cube to reflect the allocation scenario.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 17 illustrates an interface for selecting dimension members, according to one embodiment.

DETAILED DESCRIPTION

Figure 1:
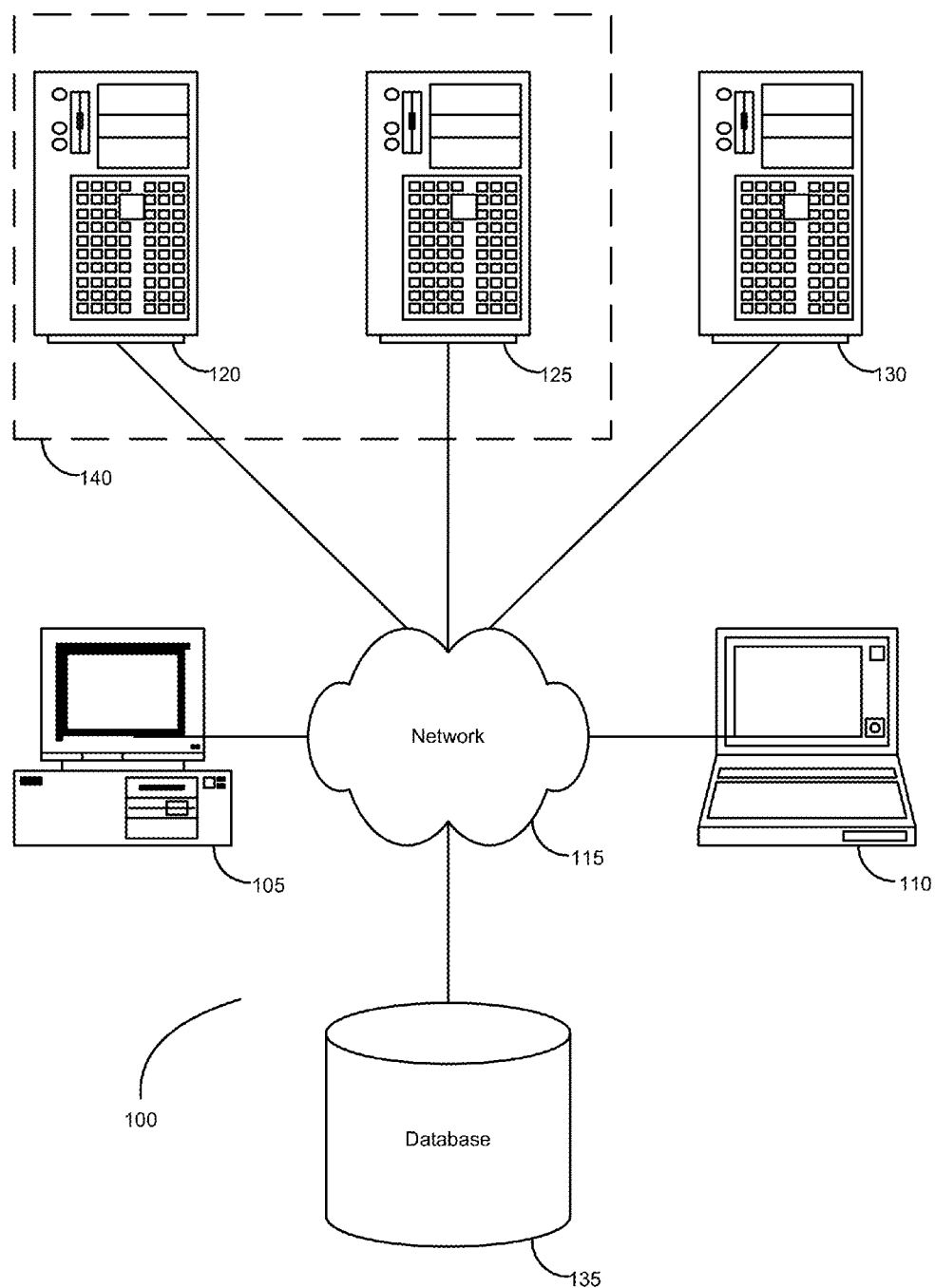
FIG. 1 illustrates a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Described herein, are embodiments for using allocation rules and formulas to generate periodic journal postings for a general ledger. Allocation rules may be used to distribute funds between various child organizations based on one or more characteristics, such as total number of employees, total payroll, and/or the like. Additionally, formulas may be used to create transfers of funds between accounts based on characteristics of the accounts, such as allocating a certain percentage of accounts receivable for unrecoverable debts. These allocation rules and formulas may create scenarios by writing to a scenario dimension within a multidimensional data cube, and thus utilize the speed and aggregated balances that are not available in a relational database. The generated scenarios in the cube may then be fed into a general ledger interface to create regular journal entries corresponding to the allocations and/or transfers. The journal entries may then be posted to the general ledger, which updates a relational database. The relational database may then in turn post the update to the multidimensional data cube so that the balances may be re-aggregated and available for immediate use, generally in real time.

Also described herein, are embodiments for defining allocation rules and transfer formulas using a progressive user interface. A computer system may provide an interface to define a point-of-view which defines one or more characteristics of the transaction and/or allocation. During the definition process, the interfaces may be presented sequentially such that the user is presented with small portions of the definition to complete at each stage. The interface may also be intelligently presented, such that information already provided or available in the point-of-view, or basis, etc., may be eliminated, thus minimizing the amount of information that a user has to wade through in order to fully define the allocation rule and/or formula.

If these allocation rules and/or formulas were used to schedule periodic transfers using only a relational database, the overhead in calculation time would become computationally prohibitive. Intermediate and final totals must be calculated at runtime, and information must be retrieved from (and stored in) the database using query language statements. Scheduled allocations and/or transfers would then have to be entered into an accounting journal, the entries would have to be approved, and the entries would have to be manually posted to the relational database and the accounting system. Each step may require some form of human interaction and/or approval. Because allocations and formulas may include tens of thousands of transfers affecting many different companies, and cost centers within and across ledgers, it would be easy for a system to become overwhelmed by simple transactions that needed to occur monthly, weekly, or daily.

As used herein, the term "multidimensional data cube" may be used to describe a data structure having multiple dimensions. Specifically, the multidimensional data cube data with four or more dimensions. The multidimensional data cube may also be referred to as a Hyperion Essbase cube. The multidimensional data cube provides for multiple levels of detail within each dimension by arranging the members of each dimension into one or more hierarchies. A "time" dimension, for example, may be represented as a hierarchy starting with the total time, and breaking child layers down into years, quarters, months, and/or days. Similarly, an "accounts" dimension may begin at the top level with net income, which is broken further down into sales, expenses, expense accounts, and/or the like.

Another feature of multidimensional data cubes is pre-aggregated balances. Balances may be aggregated at each level of the dimension. For example, the profit dimension may have aggregated totals for total profit in a year, a month, a quarter, and/or the like. For each of these total profits, there may be further aggregated profits for each child (sales, expenses, revenues, etc.) and each additional dimension. For example, there may be aggregated balances for total profits per year/month/quarter for each geographic region, business organization, and/or the like. These aggregated balances are updated constantly and are therefore available without additional calculations when used at runtime. These may be referenced simply, without complex query language statements. One commercial product implementing the multidimensional data cube for financial data storage and analysis is the Oracle® EssBase product.

Each of the embodiments disclosed herein may be implemented in a computer system. FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10 g, that is adapted to store, update, and retrieve data in response to SQL-formatted commands.

Figure 2:
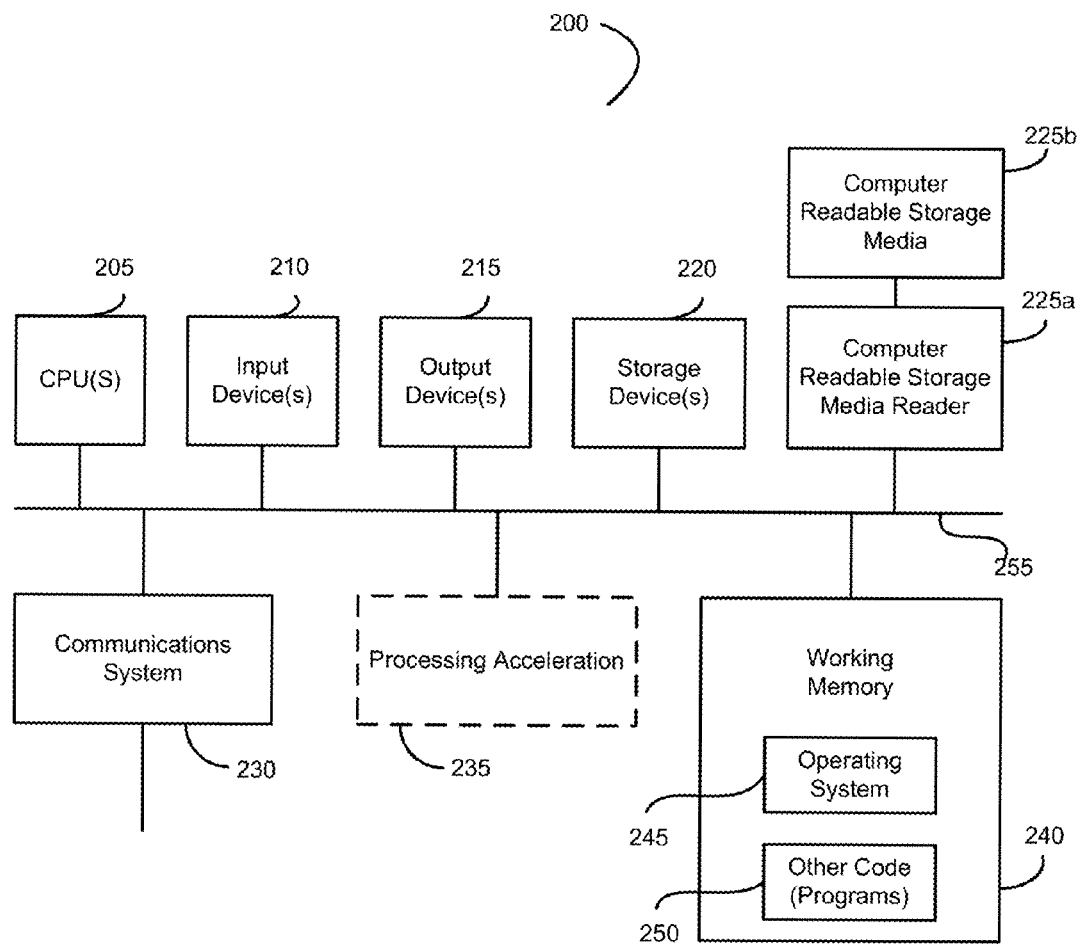
FIG. 2 illustrates a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

The following methods may be implemented by a computer system, such as computer system 200 in FIG. 2. Each step of these methods may be done automatically by the computer system, and/or may be provided as inputs and/or outputs to a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a Web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Therefore, it will be understood in light of this disclosure, that each step and each method described herein may be altered to include an input and output to and from a user, or may be done automatically by a computer system.

Figure 3:
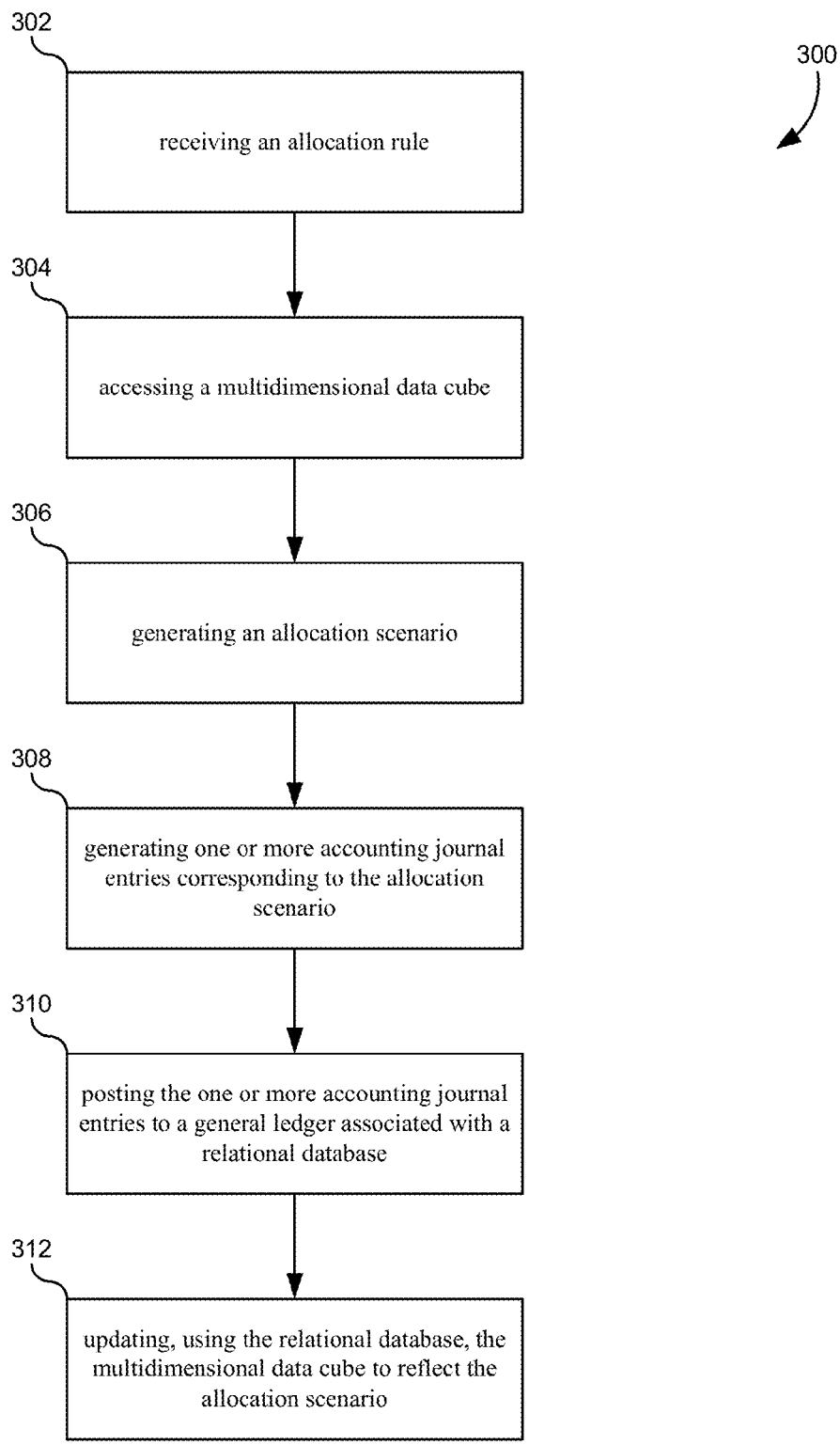
FIG. 3 illustrates a flowchart of a method for using a rule to execute periodic allocations of funds in a hierarchal accounting structure, according to one embodiment.

FIG. 3 illustrates a flowchart 300 of a method for using a rule to execute periodic allocations of funds in a hierarchal accounting structure, according to one embodiment. Periodic allocation of funds may occur, for example, monthly or weekly, and may be used to distribute funds from one or more accounts into a plurality of other accounts. Furthermore, the allocation may be made according to an allocation basis. The allocation basis may be a metric used to allocation funds between accounts. For example, a monthly sum may be distributed into multiple expense accounts associated with departments involved in purchasing for an organization. The monthly sum may be divided proportionally based on the previous month's expense account balances or based on statistical information like headcount or square footage.

The method may include receiving an allocation rule (302). In one embodiment, the allocation rule may comprise a source account and a rule for determining a first amount from the source account. For example, the rule for determining the first amount from the source account may be applied to a payroll account. The rule may be any logical expressions such as, "total activity last month," or "total amount transferred this month." The rule may be applied to the source account to determine the first amount to be allocated to the target accounts. In the example above, an amount equal to the total of last month's activity in an account may be set aside this month as the first amount to be allocated among the target accounts. The allocation rule may further comprise a parent account and an allocation basis. The allocation basis may use characteristics of one or more child accounts of the parent account to determine a proportion of the first amount to be allocated to the one or more child accounts. For example, the total number of employees may be used as a basis, such that the first amount is distributed proportionally based on the number of employees in each target account's organization. In another embodiment, the allocation basis may also use characteristics of other accounts, organizations, variables in the accounting system, and/or other factors not described specifically herein. For example, the characteristics of one set of child accounts may be used as a basis for allocation into another set of child accounts. Thus, the total number of employees in a set of departments related to a first set of child accounts may be used as a basis for allocating funds to a second set of child accounts that may or may not be related to the set of departments.

The method may also include accessing a multidimensional data cube (304). In one embodiment, the multidimensional data cube may comprise a hierarchal arrangement comprising the source account, the parent account, and the one or more child accounts, and aggregated balances for each level of the hierarchal arrangement. In one embodiment, the multidimensional data cube is distinguished from a table-based relational database. In one embodiment, the multidimensional data cube is comprised of the Oracle® EssBase data structure.

The method may additionally include generating an allocation scenario (306). In one embodiment, the allocation scenario may be allocated by allocating the first amount to the aggregated balances for the one or more child accounts according to the allocation rule. The allocation scenario may be generated within the multidimensional data cube. In one embodiment, the multidimensional data cube may be extended to include a scenario dimension specifically used for generating, storing, and calculating allocation scenarios. scenario dimension may include dimensions for the pre-aggregated balances used in the allocation rule, as well as additional dimensions that may be used to hold the intermediate and final calculated values generated by this and other methods. This may enable an allocation manager to use data directly from the multidimensional data cube for step down allocations, or to use the data multiple times in one-generation process. Compared to using and/generating data in a relational database, the multidimensional data cube will generally be orders of magnitude faster and less computationally intensive.

In another embodiment, allocation rules may be combined such that a second allocation relies on the results of the first allocation. For example, funds may be allocated from the first account to the children of a second account according to an allocation basis. Then, funds from one or more of the child accounts may be further allocated to the child accounts of the third account. Writing the allocation scenarios to the multidimensional data cube in this instance may be particularly advantageous because totals from each stage in the allocation process will be immediately updated as aggregated balances in other levels.

In another embodiment, the allocation rule may further comprise an offset. An offset may be a member that includes a compensating value that may be written into the allocation. Because the debits and credits in any accounting transaction need to balance out to a zero-sum, some of the first amount from the source account may be diverted from the allocation process into a different target in the form of an offset. Usually, the offset is used to create a credit when allocating expenses. The offset may be a receiver for an offsetting debit or credit to balance out the generated allocation and/or formula.

In another embodiment, the allocation rule may further comprise an exclusion. An exclusion may be used to prevent or modify the funds from being allocated to one or more of the child accounts. Alternatively, an exclusion may comprise dimension values to exclude from the allocation range.

The allocation rule may be received from an interface presented to a user, and configured to prompt the user to enter one or more characteristics of the allocation rule. In one embodiment, the interface may be comprised of successive data entry screens that are presented to the user. Each screen may be dynamically altered or configured to only present prompts for needed information. Therefore, if the user has already entered information that may be used to define one or more characteristics of the allocation rule, prompts for this information may be removed from the interface. For example, if the user has defined a point-of-view that includes information to be used as a default for one more characteristics of the allocation rule, prompts for the same information may be excluded from the interface. An example of such an interface will be described later in this disclosure.

The method may further include generating one or more accounting journal entries corresponding to the allocation scenario (308). In one embodiment, the allocation may be written back to a general ledger interface. The general ledger interface may be a standard interface used to enter transactions that will eventually be posted to the general ledger. The general ledger interface may create journal entries using a journal import module configured to import and translate the data from the allocated scenario dimension into journal entries. The journal entries may be entered into batches that correspond with each transaction. In one embodiment, the process of turning an allocation scenario into one or more journal entries may be completely automated by an accounting system, such that no human interaction need be provided.

The method may also include posting the one or more accounting journal entries to a general ledger associated with a relational database (310). In one embodiment, the journal entries may be posted automatically as soon as they are entered into one or more journals. If a journal reposting requires authorization, such authorization may be either explicitly provided during the definition of the allocation rule, or may be implicitly fulfilled by the allocation rule. In other words, some embodiments may view the posting of journal entries resulting from an allocation rule as preapproved.

In one embodiment, the general ledger may be represented by the relational database. Therefore, when a journal entry is posted to the general ledger, the details of the transactions within the journal entry are written to one or more tables within the relational database. In one embodiment, the journal entries may be posted to one or more subledgers that are also represented by relational databases, then posted to the general ledger when the one or more subledgers are balanced and/or closed for a relevant accounting period.

The method may additionally include updating, using the relational database, the multidimensional data cube to reflect the allocation scenario (312). In one embodiment, entries in the relational database may be used to update values in the multidimensional data cube. When values in the multidimensional data cube are updated, the aggregated balances in each level of the hierarchy that are affected by the update may also be recalculated automatically. In one embodiment, the allocation scenario that was previously written to the multidimensional data cube may be deleted. For example, the allocation scenario may be written in the data cube in order to utilize the aggregated balance functionality. However, the allocation scenario may be viewed as temporary. Therefore the data in the allocation scenario may be removed from the multidimensional data cube prior to the posting of the one or more journal entries. In one embodiment, this may occur at the same time as the data are written to a general ledger interface table. When the data in the allocation scenario is deleted from the multidimensional data cube, the aggregated balances at each level in the hierarchy may be recalculated.

Figure 4:
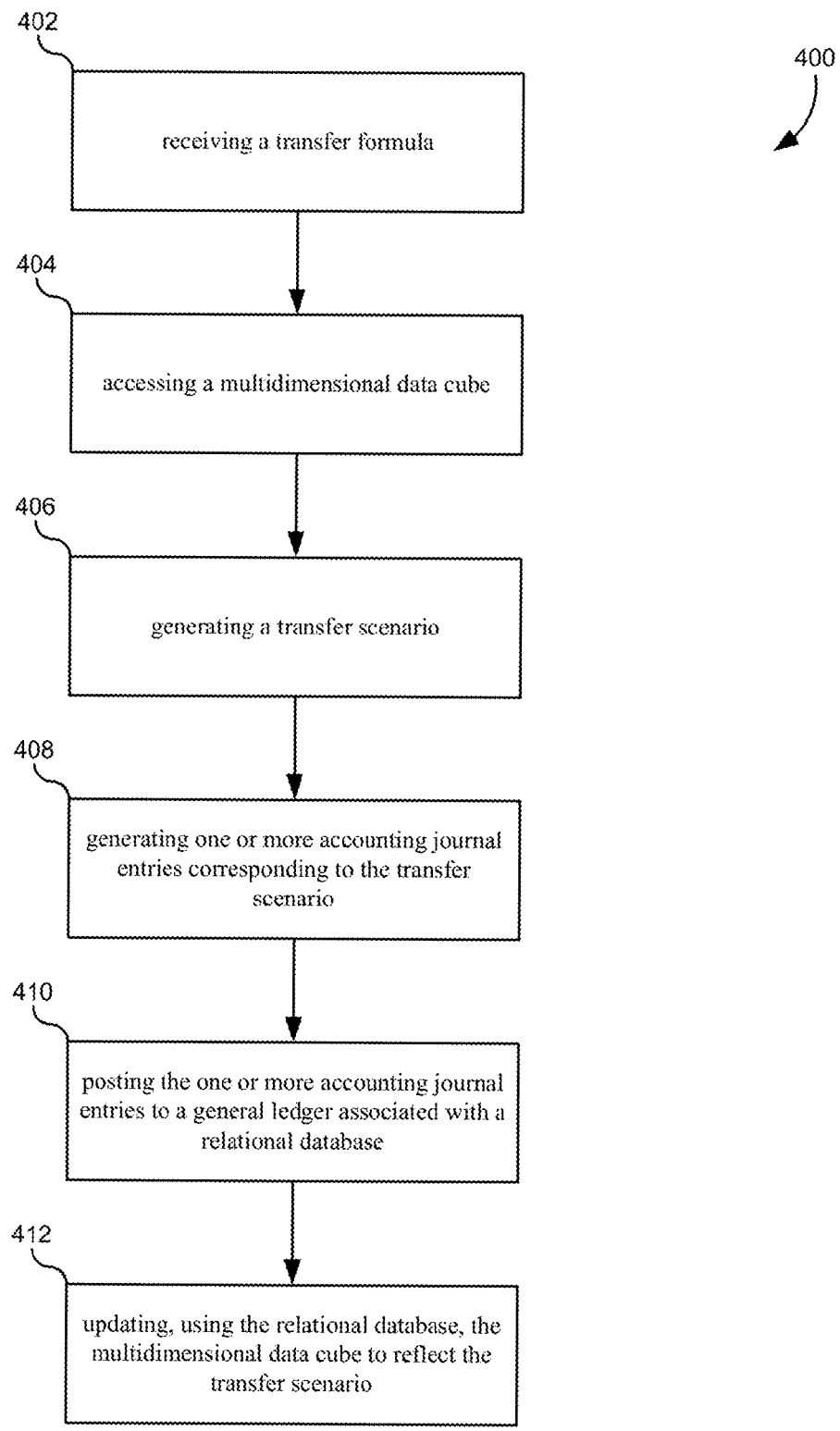
FIG. 4 illustrates a flowchart of a method for using a formula to execute periodic transfers in a hierarchal accounting structure, according to one embodiment.

FIG. 4 illustrates a flowchart 400 of a method for using a formula to execute periodic transfers, also known as "formula recurring journals," in a hierarchal accounting structure, according to one embodiment. Note that many of the steps in flowchart 400 are similar to the steps in flowchart 300 of FIG. 3. In some embodiments, the process for defining and/or executing a transfer formula may be very similar to the process for defining and/or executing an allocation rule. Both processes may use the advantages of the aggregated balances in the multidimensional data cube to generate scenarios. The scenarios may then be imported through a general ledger interface to create journal entries, posted to a general ledger, and eventually used to update values and aggregated balances within the multidimensional data cube. As used herein, the term "transfer formula" may include transfers of funds, as well as nullifying accounts, reclassifying accounts, amortization, and booking of periodic expenses, such as rent, insurance, and/or loan repayments.

The method may include receiving a transfer formula (402). In one embodiment, the transfer formula may comprise a source account, a target accounts, an offset account, an account characteristic, and/or a formula for determining a first amount of the source account based on the account characteristic. The source account may be the source of the transferred funds, and the target account may be the destination of the transferred funds. The account characteristic may be any characteristic of any account within the accounting system. For example, the account characteristic may be a set of specific values for various dimensions in the multidimensional data cube. Therefore, the account characteristic may be received through an interface that allows the user to select one or more dimensions from account within the multidimensional data cube. For example, the account characteristic may be the actual activity of a particular account during the period-to-date. These account characteristic may pertain to the source account, the target account, and/or any other account.

In one embodiment, the formula for determining a first amount of the source account based on the account characteristic may be a simple arithmetic expression. For example, the actual activity of a particular account during the period-to-date may be multiplied by a factor, such as 5%, 10%, 15% and/or the like, in order to transfer a percentage of funds from the target account to the source account based on the source account activity. The formula may also combine multiple account characteristics according to any known arithmetic operators and/or logical combinations. It will be understood in light of this disclosure that very complex formulas may be defined to include any number of account characteristics and or operators.

In another embodiment, transfer formulas may be combined with allocation rules to first transfer funds from a source account to a target account. The transferred funds may then be allocated to subaccounts of the target account. Other combinations may also be used. For example, funds may be allocated between the number of child accounts, or subaccounts, and then funds may be transferred from one or more of the child accounts to a target account according to a transfer formula. It will be understood in light of this disclosure that multiple combinations of allocation rules and transfer formulas may be combined together to form complex transfer formulas and allocation expressions that can be used to generate journal entries.

The method may also include accessing a multidimensional data cube (404). In one embodiment, the multidimensional data cube is similar to the multidimensional data cube described earlier in relation to block 304 of FIG. 3. Therefore, the multidimensional data cube may comprise a hierarchal arrangement comprising the source account, the target account and the offset. The multidimensional data cube may also include aggregated balances for each level of the hierarchal arrangement. In one embodiment, the multidimensional data cube may be implemented using the Oracle® EssBase product.

The method may additionally include generating a transfer scenario (406). In one embodiment, the transfer scenario may be generated by transferring the first amount to the aggregated balance for the target account according to the transfer formula. Again, the transfer scenario may be generated and stored within a special transfer/allocated scenario dimension member within the multidimensional data cube. This will allow the transfer scenario to take advantage of the aggregated balances and stored values in the multidimensional data cube, which may offer significant processing and/or computational advantages over accessing and storing data in a relational database.

The method may further include generating one or more accounting journal entries corresponding to the transfer scenario (408), posting the one or more accounting journal entries to a general ledger associated with a relational database (410), and updating, using the relational database, the multidimensional data cube to reflect the transfer scenario (412). In some embodiments, blocks 408, 410, and 412 may be similar to blocks 308, 310, and 312 of FIG. 3. Therefore, it will be understood that the description of FIG. 3 may also apply to these same blocks in FIG. 4. In one embodiment, the transfer scenario that was previously written to the multidimensional data cube may be deleted. For example, the transfer scenario may be written in the data cube in order to utilize the aggregated balance functionality. However, the transfer scenario may be viewed as temporary. Therefore, the transfer scenario may be removed from the multidimensional data cube prior to the posting of the one or more journal entries. When the transfer scenario is deleted from the multidimensional data cube, the aggregated balances at each level in the hierarchy may be recalculated automatically.

It should be appreciated that the specific steps illustrated in FIG. 3 and FIG. 4 provide a particular method of executing and/or defining allocation rules and transfer formulas according to embodiments of the present invention. Other sequences of steps may also be performed according to alternative embodiments. For example, alternative embodiments of the present invention may perform the steps outlined above in a different order. Moreover, the individual steps illustrated in FIG. 3 and FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5A:
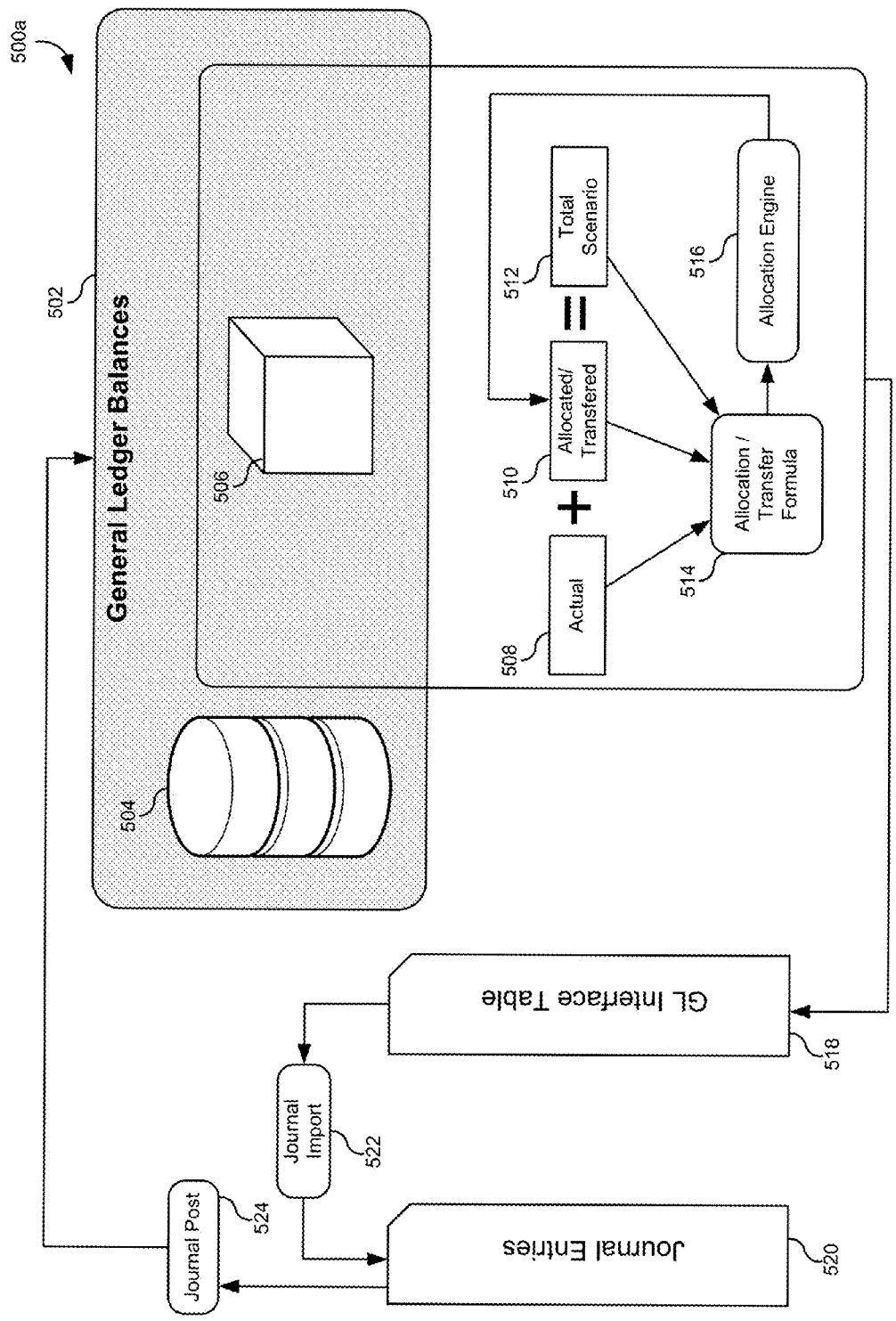
FIG. 5A illustrates a block diagram and of a system for defining and executing allocation rules and transfer formulas, according to one embodiment.

FIG. 5A illustrates a block diagram 500a of a system for defining and executing allocation rules and transfer formulas, according to one embodiment. A general ledger 502 may be represented by an underlying relational database 504. The underlying relational database 504 may be the original data source for a multidimensional data cube 506. The multidimensional data cube may use values from the relational database 504 to create and hierarchy and generate aggregated balances within the hierarchy.

When an allocation rule and/or transfer formula is defined, actual values 508 from the multidimensional data cube 506 may be used for these definitions. The allocation rule and/or transfer formula may be received by an allocation/transfer formula module 514 that uses the actual values 508 as input. In one embodiment, the "actual values" are the current values in the multidimensional data cube representing the balance of an account. Because complex expressions may be defined in the allocation/transfer formula module 514, intermediate results 510 of allocations or transfers may also be used as an input to the allocation/transfer formula module 514. A total scenario 512 may be generated as the cumulative result of all or some of the allocation rules and/or transfer formulas that are being executed. The total scenario 512 along with any other details in the allocation/transfer formula module 514 may be run through an allocation engine 516 to generate the final result or any other intermediate results 510. Intermediate results 510 may be fed back into the process in order to generate a final result.

In one embodiment, a "scenario" may be defined as a dimension member in the multidimensional data cube for classifying balance data. For example, a balance may be classified as actual, budget, forecast, allocated, etc. In the case of allocations, there may be two specific seeded scenarios for step down allocations. In one instance, an allocated scenario temporarily holds the allocated values during the rule generation process. In another instance, an allocated scenario holds a total for the allocations, i.e. a sum of the actual and allocated amounts. An example of this is discussed further in FIG. 5B below.

Once the transfer/allocation scenario is complete, the scenario may be transferred to the data entry portion of the system. In the data entry portion of the system, the general ledger interface table 518 may accept the data in the allocated scenario member, and translate the data into one or more journal entries. In one embodiment, a scenario may be comprised of numerous transactions between numerous accounts. Therefore, scenario data may range from simple to complex, and may result in one or many journal entries. In one embodiment, a single scenario may generate many journal entries, such as a transfer formula that shifts money from every expense account into a payment account. The single scenario may result in hundreds of journal entries that correspond to each expense account within an organization.

After one or more journal entries are created by the general ledger interface table 518, the journals may be imported through a journal import module 522 to one or more journals 520. As described in the example above, the journal entries may correspond to many different individual journals. In one embodiment, the journal entries are received by one or more journals 520 through the same interface used for manual entry. In another embodiment, the one or more journal entries are received by the one or more journals 520 as a data stream input.

After the journal entries are received by the one or more journals 520, the journal entries may be posted using a journal posting module 524 back to the general ledger 502. In one embodiment, the journal entries resulting from the scenario may be automatically posted as soon as they are received by the one or more journals 520. In another embodiment, the journals may be posted afterwards according to a periodic process. For example, a user may manually inspect each journal at the end of a month, week, or accounting period and post all the journal entries at that time as a batch. The journal posting module 524 may or may not include a review and approval procedure. As described above, when the journal entries are posted to the general ledger 502, the relational database 504 may be updated. The relational database 504 may then communicate these updates to the multidimensional data cube 506, where the aggregated balances and values in the hierarchy may be updated accordingly.

In one embodiment, the various modules and systems in FIG. 5 may reside on separate computer systems. Alternatively, multiple modules may be combined on the same or similar computer systems. In addition, some modules may be combined together into a single module performing the functions of both individual modules. Similarly, a single module may be split into multiple modules. It will be understood in light of this disclosure that any arrangement of the modules, as well as any implementation in both software and hardware, may be used by various embodiments.

Turning now to an embodiment illustrating a specific set of examples, a series of user interfaces will be presented in the figures described below. These interfaces illustrate a sequential method of receiving an allocation rule definition and/or a transfer formula definition from a user. Each of these interfaces may be modified at runtime to omit or include information that is already known by the computer system. Therefore, the data, layouts, labels, and controls illustrated in each interface are merely exemplary, and not meant to be limiting. It will be understood in light of this disclosure that many different configurations for interfaces may be used consistent with the spirit of the present invention.

Figure 5B:
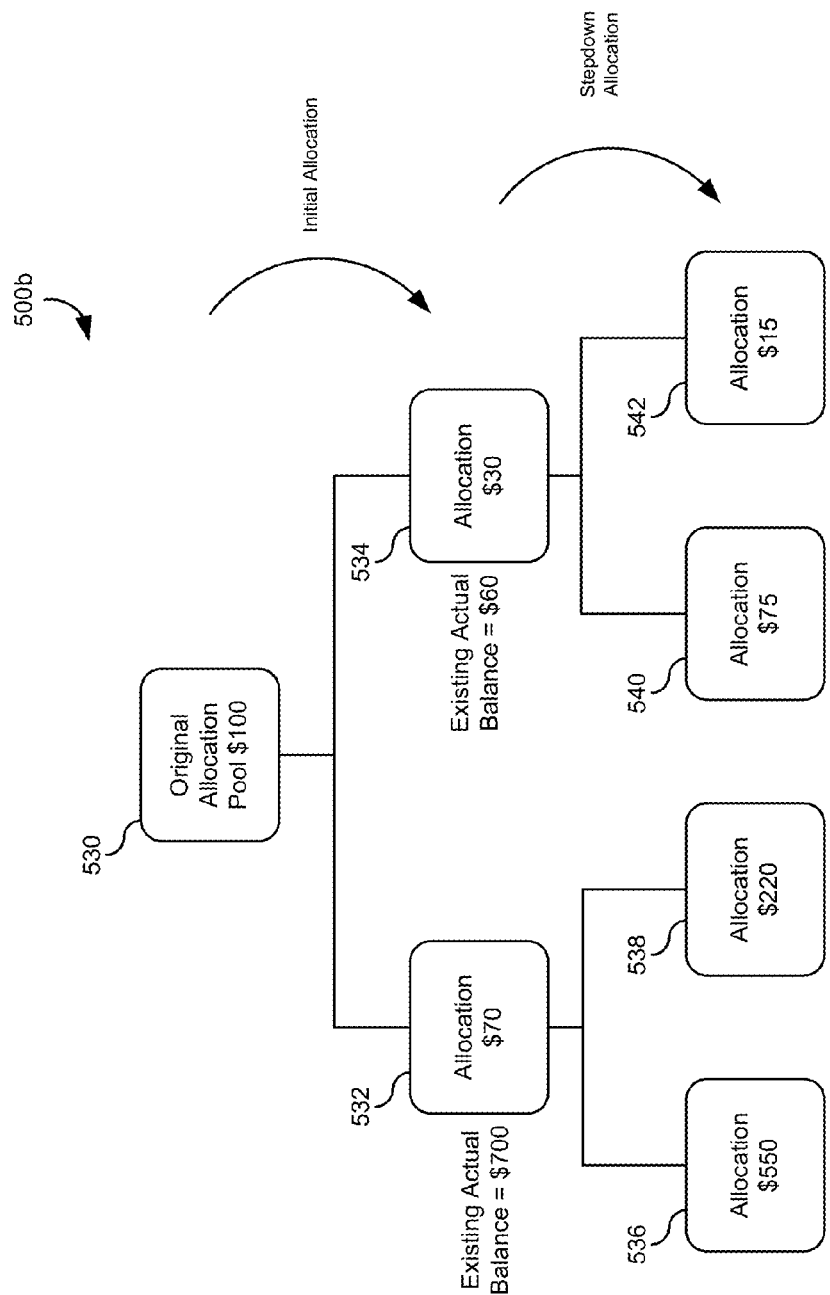
FIG. 5B illustrates a process flow diagram of a multistep allocation process, according to one embodiment.

FIG. 5B illustrates a process flow diagram 550b of a multistep allocation process, according to one embodiment. Process flow diagram 550b illustrates the advantages to be gained using a multidimensional data cube to generate and store intermediate allocations and balances. An original allocation pool 530 may contain a lump sum to be allocated amongst various child accounts. In this example, the original allocation pool has $100 to allocate between two child accounts, namely account 532 and account 534. As described above, an allocation basis may determine the proportions of the $100 that should go to the two child accounts. In this example, the allocation basis may determine that $70 out of the $100 should go to account 532, while the remaining $30 should go to account 534.

After this initial allocation, the existing balances in account 532 and account 534 may be updated in the scenario section of the multidimensional data cube. This is important because an allocation may include numerous steps, or subsequent "stepdown" allocations. In this example, the updated balances in account 532 and account 534 may, according to the allocation rule, be further allocated among their respective child accounts. After the initial allocation, account 532 may have the $70 added to an existing balance of $700 for a total of $770. Similarly, account 534 may have the allocated $30 added to an existing balance of $60 for a total of $90. These updated balances may be written to the scenario section of the multidimensional data cube for rapid calculation and access.

During a subsequent, or step down allocation, the updated balances in account 532 and account 534 may be further allocated to their respective child accounts. Each subsequent allocation may have its own allocation basis, offset, etc. In this example, the $770 in account 532 is allocated between account 536 and account 538, resulting in updated balances of $550 and $220, respectively. Similarly, the $90 in account 534 may be allocated between account 540 and account 542, resulting in updated balances of $75 and $15, respectively. Although only two allocation levels are shown in FIG. 5B, it will be understood that many allocation levels may exist in a single allocation rule. In practice, a top-down allocation scheme may result in tens or hundreds of levels of allocations according to a single allocation rule. This further illustrates the importance of using a scenario dimension in the multidimensional data cube. Otherwise, runtime calculations using a relational database could be prohibitively slow and computationally intensive.

Figure 6:
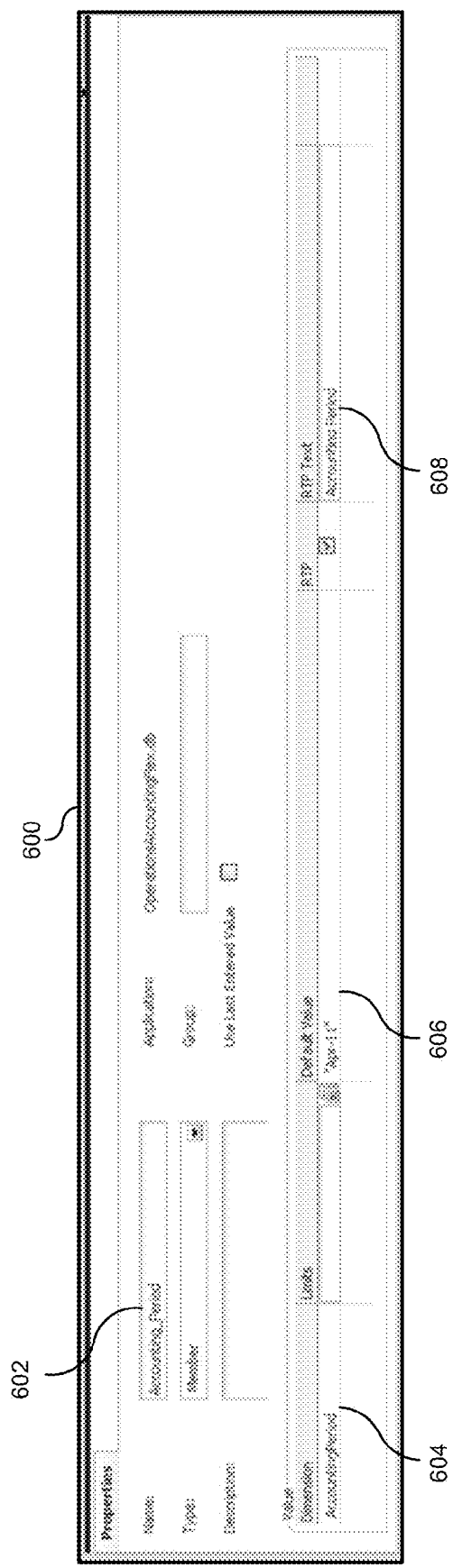
FIG. 6 illustrates an interface for defining a runtime prompt, according to one embodiment.

FIG. 6 illustrates an interface 600 for defining a runtime prompt, according to one embodiment. A run-time prompt (RTP) variable may represent a component of a rule or formula that may need to change when the rule or formula is executed. A user may generate an RTP variable using interface 600 and assign it to one or more formulas and/or rules. When it comes time to execute a rule or formula, an interface may be provided that is configured to accept a value for the RTP variable from a user. An example of an RTP variable is the accounting period to be used in a transaction. Because the accounting period may change depending on when the rule or formula is executed, this variable may need to be manually entered at runtime.

Interface 600 allows a user to defined RTP variable using a name (602) so that it can be saved and loaded for later use. An RTP variable can be created once and shared across multiple rules and/or formulas. Generally, in RTP variable will be implemented using a dimension from a multidimensional data cube. In this example, the dimension is the "Accounting-Period" dimension 604. The interface may also allow the default value 606 to be provided and an RTP text prompt 608 describing the RTP variable. Thus, when a rule or formula is executed that depends on the RTP variable, the RTP text prompt 608 may be displayed, and a value may be received. In one embodiment, a value field may be populated with the default value 606. In another embodiment, the default value 606 may be used instead of displaying a prompt to the user, unless the user overrides the settings and manually enters a value.

Figure 7:
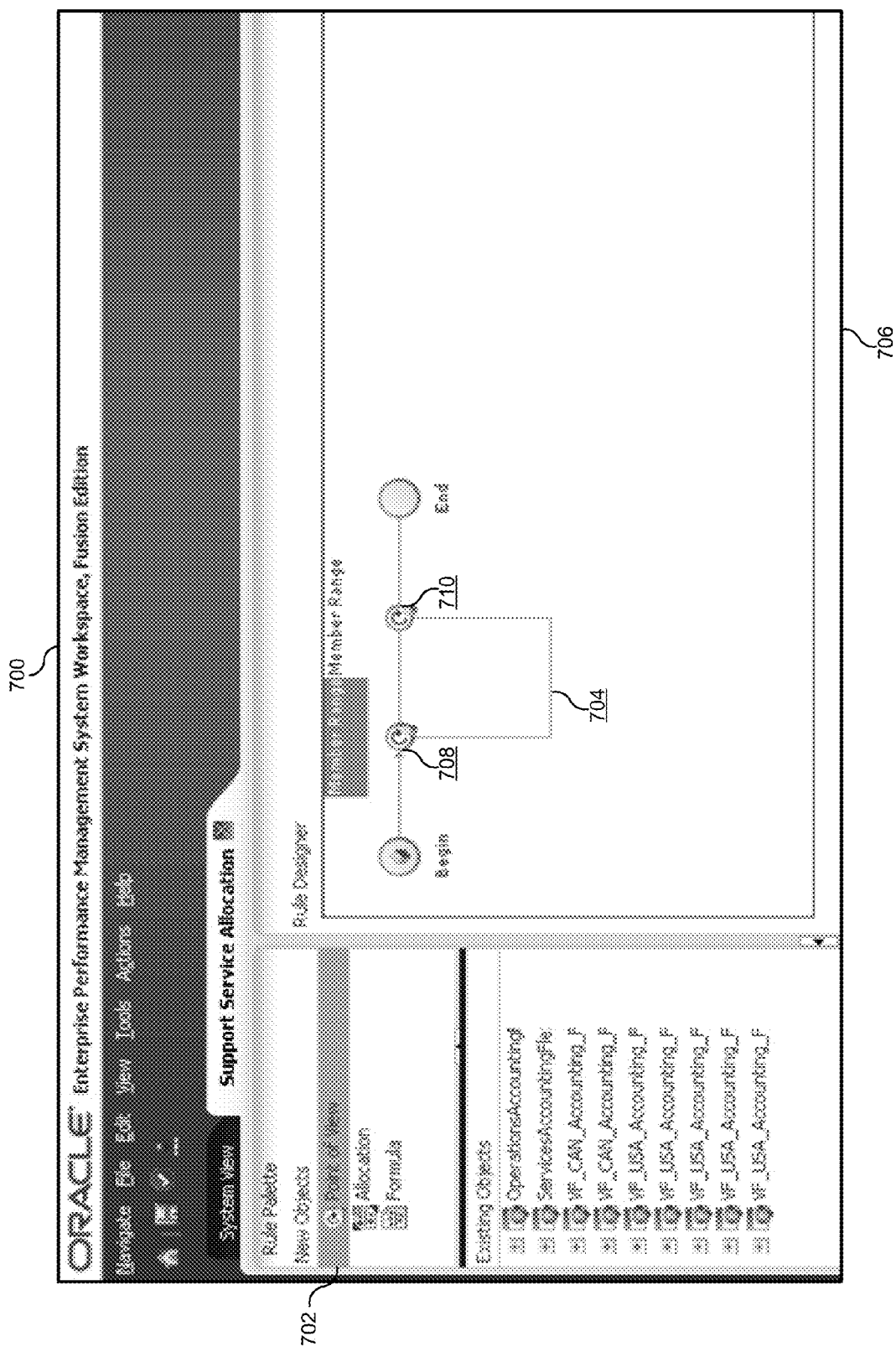
FIG. 7 illustrates an interface for designing a rule or allocation, according to one embodiment.

FIG. 7 illustrates an interface 700 for designing a rule or allocation, according to one embodiment. Interface 700 includes drag-and-drop controls 702 the may be used to define an allocation rule or a transfer formula. A point-of-view control 704 may be dragged into a rule designer area 706 to define a particular point-of-view to be used during a portion of the definition. The point-of-view control 704 may indicate graphically a start point 708 and an end point 710. Any of the drag-and-drop controls 702 that are placed between the start point 708 and the end point 710 may receive and use data from the point-of-view control 704.

In one embodiment, a point-of-view is used to define dimension values from the multidimensional data cube that remain fixed throughout the entire allocation rule or transfer formula. For example, a chart of accounts may include segments for future use. The point-of-view fixes a value to be the default value so that the dimension value does not have to be selected or entered separately when defining the source, basis, target, offset, or allocation range during the definition of an allocation rule. In one sense, a point-of-view is a set of global definitions to be used through each step of the definition process. These definitions may be overridden by manually entering values for each dimension specified in the point-of-view. Additionally, a point-of-view may be used to eliminate or modify a set of sequential interfaces used to define an allocation rule or transfer formula. For example, if a point-of-view a company value, then an allocation rule that uses the point-of-view need not present an interface configured to receive a company value for source, basis, or target account information. Thus, a point-of-view may be used to streamline the definition process and avoid presenting the user with unnecessary repetitive interfaces and requests for information.

Figure 8:
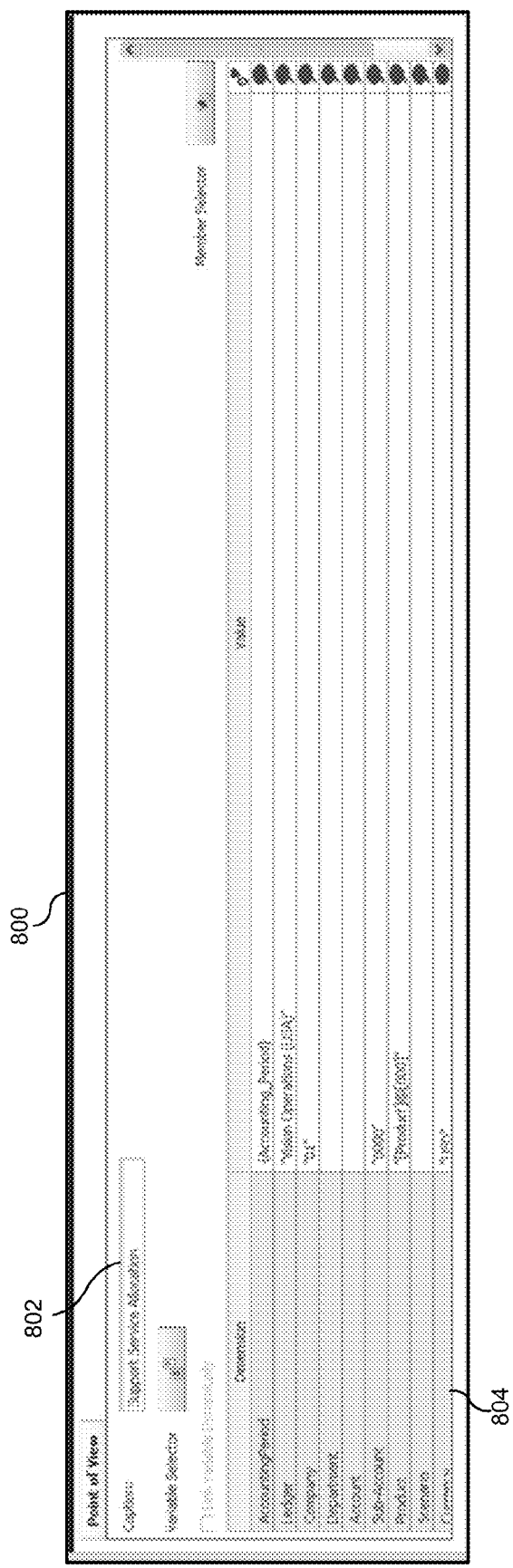
FIG. 8 illustrates an interface for defining dimensions in a point-of-view, according to one embodiment.

FIG. 8 illustrates an interface 800 for defining dimensions in a point-of-view, according to one embodiment. Like an RTP variable, a point-of-view may be given a name 802, such that it can be saved and loaded for future use in other definitions. The list of dimensions 804 may be provided by interface 800, and values corresponding to the list of dimensions 804 may be received. Any dimensions that receive a value may be assumed to use that value throughout the definition process for the allocation rule and/or transfer formula. Dimensions that do not receive a value may solicit such a value, if needed, later in the definition process using a tailored interface.

Figure 9:
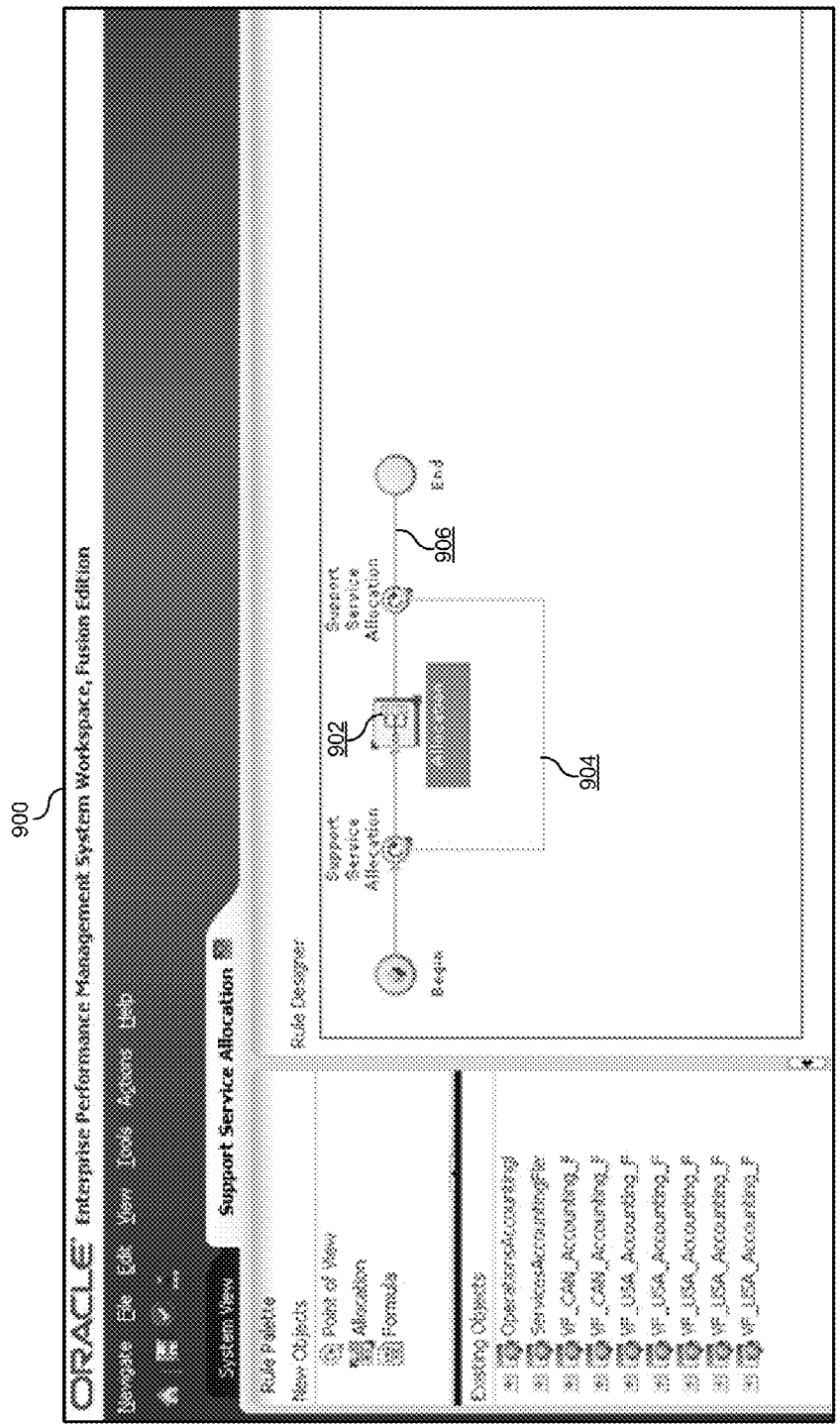
FIG. 9 illustrates an interface for defining an allocation rule, according to one embodiment.

FIG. 9 illustrates an interface 900 for defining an allocation rule, according to one embodiment. Note that interface 900 is similar to interface 700 of FIG. 7, except that an allocation control 902 has been dragged within the point-of-view control 904. Therefore, an allocation rule definition created using allocation control 902 will use any of the dimension values defined by the point-of-view control 904. Note that if allocation control 902 were dragged to a position outside of the point-of-view control 904, such as position 906, the allocation control 902 generally would not use dimension values defined from the point-of-view control 904.

Figure 10:
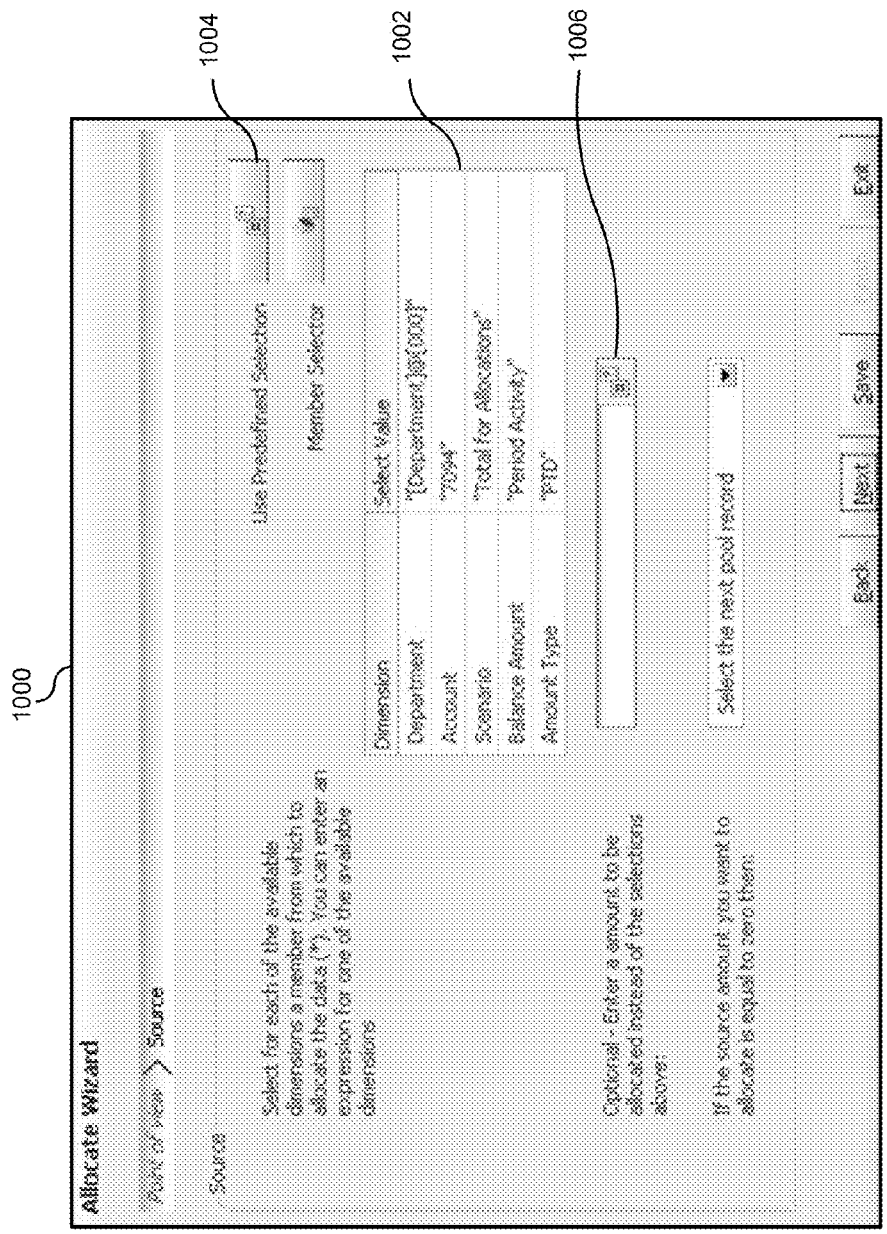
FIG. 10 illustrates an interface for defining an allocation rule using sequential interfaces, according to one embodiment.

FIG. 10 illustrates an interface 1000 for defining an allocation rule using sequential interfaces, according to one embodiment. Interface 1000 may be the first in a series of sequential interfaces configured to elicit portions of an allocation rule definition from a user. Sequential interfaces may be used to simplify the definition process. Also, by using sequential interfaces, one or more of the interfaces may be removed or adapted based on information that is already been received from the user. In this example, interface 1000 defines the source for an allocation rule. In one embodiment, the source, or source account, may be defined as an account from which funds will be allocated. An option may be provided through control 1004 to use a predefined selection. A set of dimension values may be loaded from a memory and reused to define the source of the allocation rule.

A set of needed dimensions 1002 may be provided such that a value for these dimensions may be received. Note that these dimensions include a department, an account, a scenario, a balance amount, and amount type. These are dimensions that were not defined in the point-of-view of interface 800 of FIG. 8. The accounting period, ledger, company, subaccount, product, and currency were defined by the point-of-view, and therefore are not provided in interface 1000 to solicit an input. This is one example of how interfaces may be tailored based on previously entered information and/or points of view.

In this example, one or more of the needed dimensions 1002 may be used to define a rule for determining a first amount from the source account. For instance, the balance amount and amount type may be used to define such a rule. Here, the rule for determining a first amount from the source account may be stated as the "period activity of account 7094 during the period-to-date." From this rule, an amount may be derived, namely the total activity and account 7094 during the current period, that should be allocated amongst a second set of accounts. The example in interface 1000 is merely exemplary, and not meant to be limiting. Rules and formulas can be defined based on any dimension used to describe an account. In another embodiment, the rule may comprise a fixed amount to be transferred between the source, target, and offset. For example, a user may enter a value into control 1006 to designate a fixed amount to be sent allocated among the child accounts.

Figure 11:
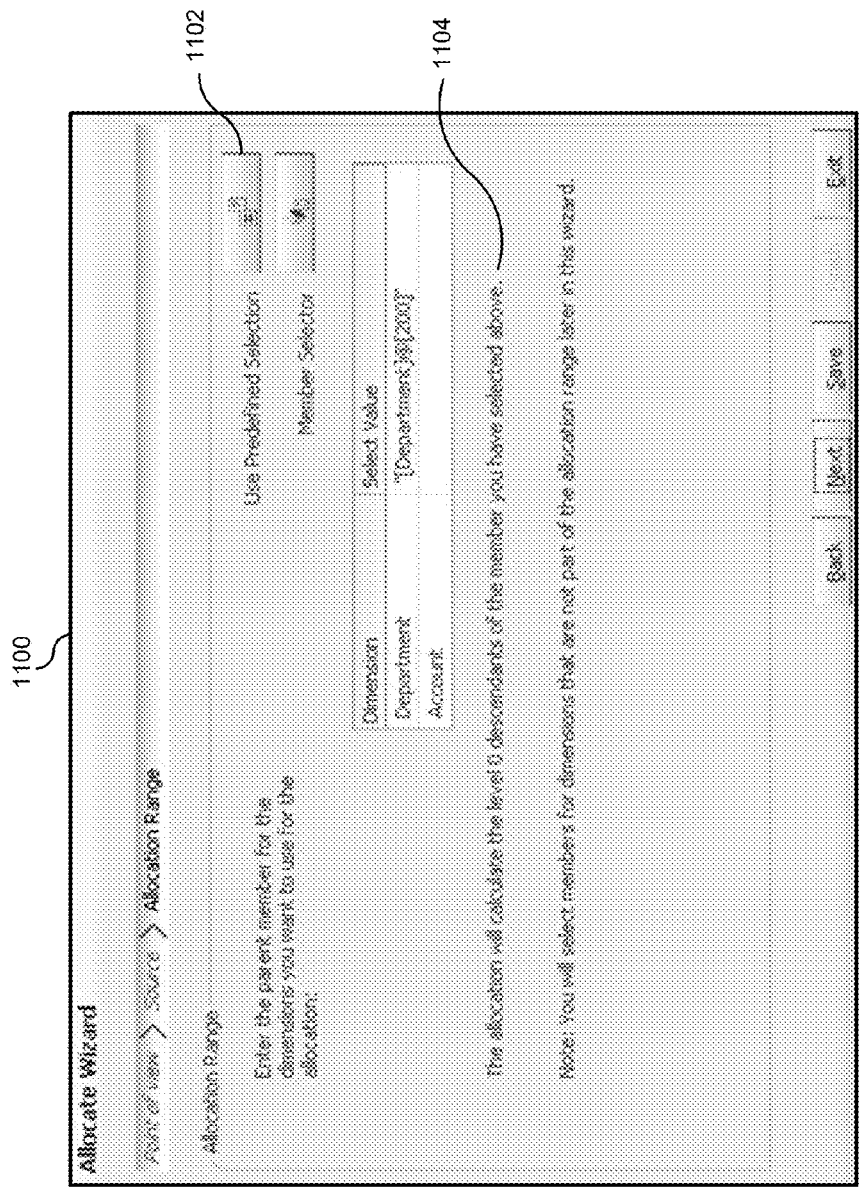
FIG. 11 illustrates an interface for defining an allocation range of an allocation rule, according to one embodiment.

FIG. 11 illustrates an interface 1100 for defining an allocation range of an allocation rule, according to one embodiment. In one embodiment, the allocation range defines the range of values on which to allocate. The allocation range may be used as the basis and the target by default. In one embodiment, the allocation range is a parent value, such that funds can be allocated to its children. In this example, department 200 may be entered for the department dimension 1102. Therefore, the children, or sub-departments, of department 200 may receive the allocation. In another embodiment, after a department dimension 1102 has been received, interface 1100 may provide an indication 1104 of how many levels of descendants may be used for the selected allocation range. In this example, only the level 0 descendants, or the immediate children, will be used. In another embodiment, more descendant levels may be used and/or indicated if they are available. Other embodiments and/or examples may allow funds to be allocated throughout multiple levels of descendants.

Figure 12:
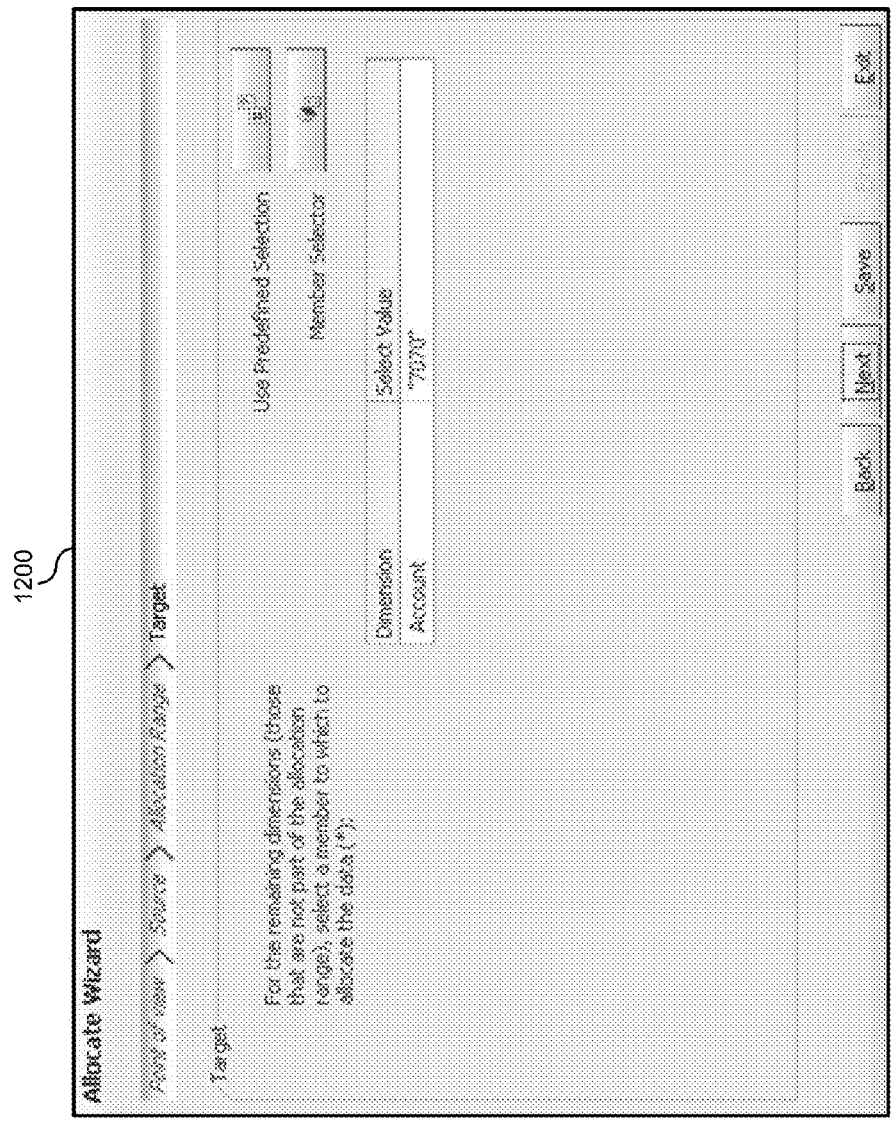
FIG. 12 illustrates an interface for receiving a target dimension for an allocation rule, according to one embodiment.

FIG. 12 illustrates an interface 1200 for receiving a target dimension for an allocation rule, according to one embodiment. Interface 1200 may be used to receive dimensions that are not a part of the allocation range or the point-of-view. In this example, the target is account 7070 for each of the sub departments of department 200. In other words, a pool balance from the target account may be allocated to the child combinations within account number 01.200.7070.0000.000. In some embodiments, the target is generally the debit side of the allocation when allocating expenses. Note that this account number includes company information ("01") from the point-of-view, department information from the allocation range ("200"), account information from the target ("7070"), subaccount information from the point-of-view ("0000"), and product dimension information from the point-of-view ("000"). This example illustrates how using previously defined dimension values and points-of-view can dramatically simplify each step in the process of defining an allocation rule.

Figure 13:
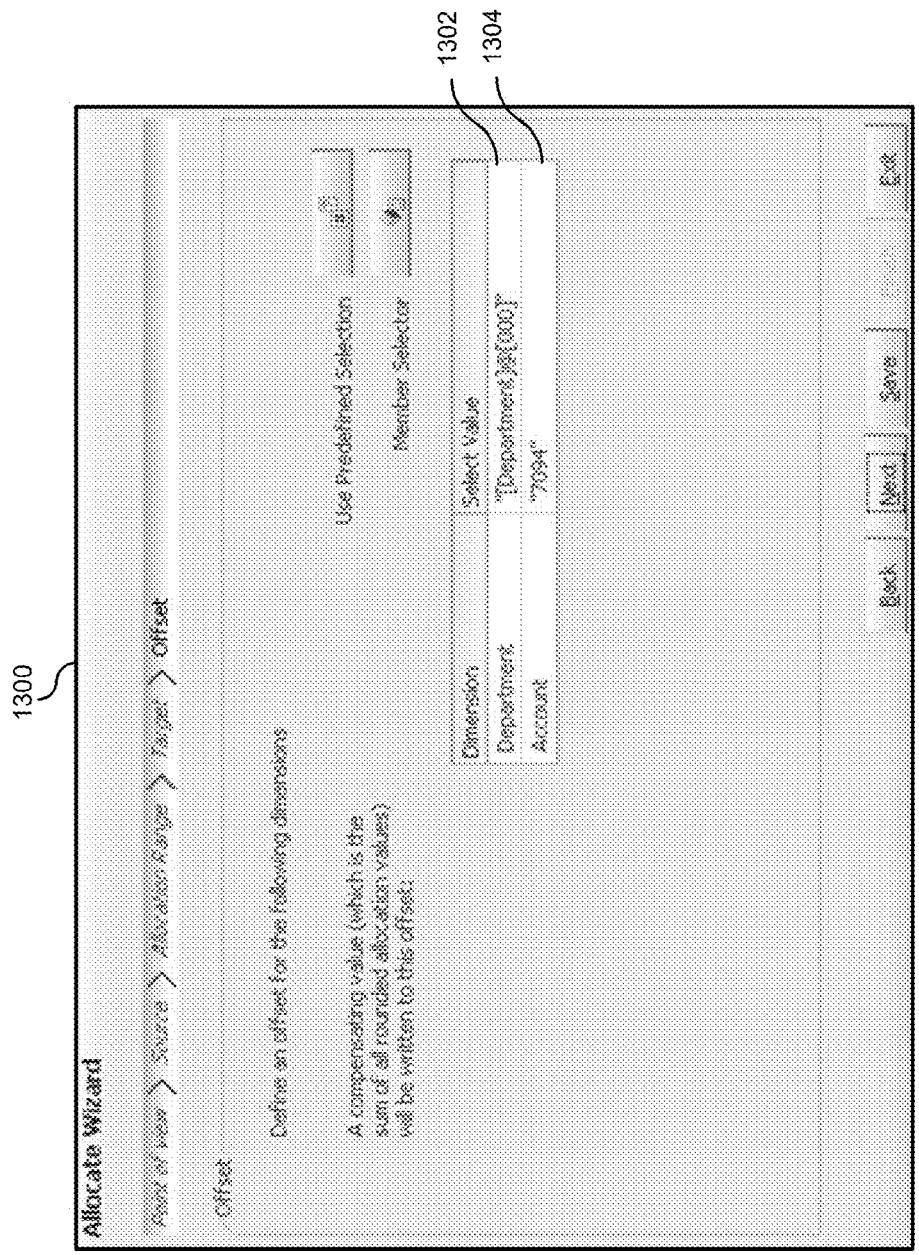
FIG. 13 illustrates an interface for receiving an offset dimension for an allocation rule, according to one embodiment.

FIG. 13 illustrates an interface 1300 for receiving an offset dimension for an allocation rule, according to one embodiment. An offset may be a compensating value, and in some cases may be the sum of all rounded allocation values. Based on the point-of-view and the previously entered dimensions in this example, a department 1302 in an account 1304 may be specified in interface 1300. In this scenario, the offset is defined as account 7094. This is the same account as the pool balance, or the source of the funds transfer. It is not required for the offset to be the same account as the pool balance. The offset is usually the credit side when allocating expenses, and may be included to help balance the accounting equation such the credits and debits are equal. The offset may be considered the receiver for the offsetting debit or credit to balance out the generated allocation and/or formula.

Figure 14:
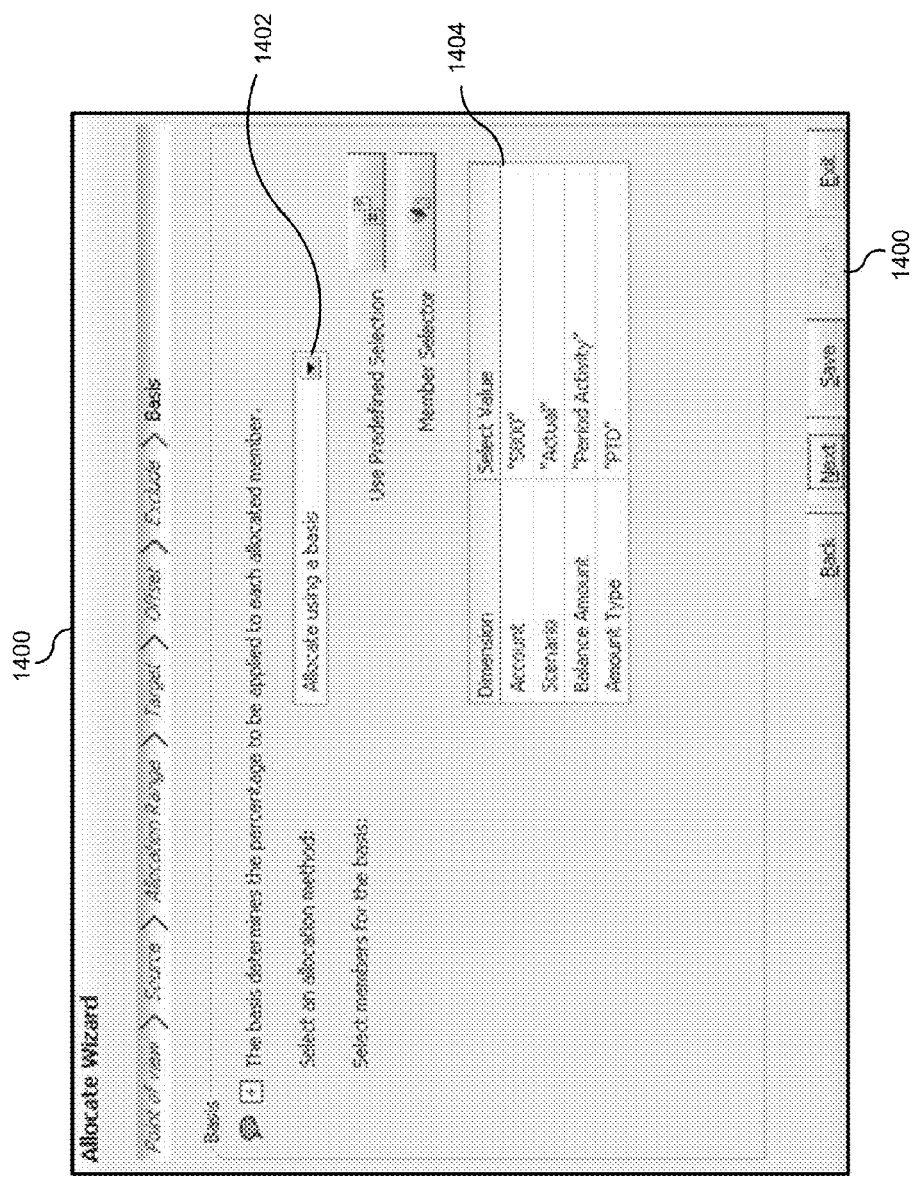
FIG. 14 illustrates an interface for defining a basis in allocation rule according to one embodiment.

FIG. 14 illustrates an interface 1400 for defining a basis in allocation rule according to one embodiment. In one embodiment, the basis may be an allocation basis that uses characteristics of one or more child accounts of the parent account to determine a proportion of the first amount (or the pool balance) to be allocated to the one or more child accounts. In other words, the basis may determine the percentage of the allocated funds to be applied to each child account. Interface 1400 may allow for the selection of an allocation method 1402. In this example, the allocation is based on a basis. However, in other examples the allocation may use fixed values or percentages, or may even distribute funds equally.

Dimensions 1404 may also be provided as members for the basis. In this scenario, the basis is defined as account 5800 which represents salary balances in each department. Here, the basis is the salary balances of each child account represented by each department's 01.200.5800.0000.000 account (salary account). Again, this basis may be constructed from the dimensions 1404 that are combined with the allocation range and the dimension values in the point-of-view. It will be understood that this particular basis for allocating funds is merely exemplary, any dimension, or characteristic, of data within the multidimensional data cube may be used to determine a basis. The basis may further include mathematical and/or logical operators and combinations of simple basis expressions to form more complex basis expressions.

In one embodiment, interface 1400 is the last interface in the series of sequential interfaces used to define an allocation rule. When a definition is completed based on receiving input from a control, such as "finish" button 1406, the definition will be ready to execute. In the current example, a user may allocate funds within department 200 using a list of allocation rules and/or transfer formulas. When the allocation rule is executed, the user may be prompted to provide a value for the RTP variable, which in this case is the accounting period. Allocation rules could be scheduled to run according to regular periodic intervals. For example, the allocation rule defined in this example may be scheduled to run at the first of each month automatically without requiring user interaction.

Figure 15:
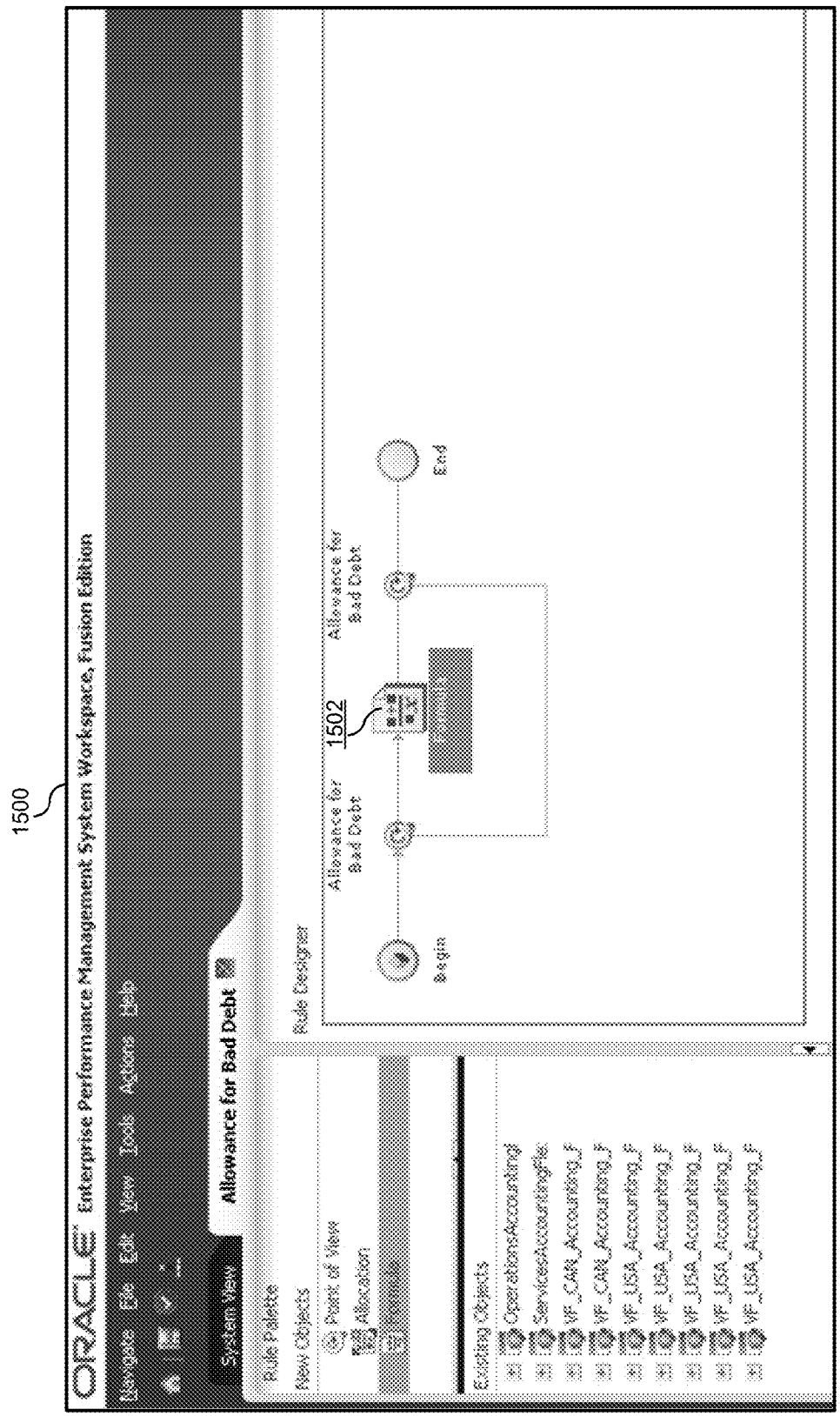
FIG. 15 illustrates an interface for defining a transfer formula, according to one embodiment.

FIG. 15 illustrates an interface 1500 for defining a transfer formula, according to one embodiment. Note that interface 1500 is very similar to interface 900 in FIG. 9. The difference here is that instead of dragging allocation control 902 within the point-of-view control 904, a formula control 1502 is used instead. Although the formula control 1502 and the allocation control 902 are not used together in these figures and examples, it will be understood that any combination of formula controls and allocation controls may be graphically arranged relative to any number of point-of-view controls to create rules and formulas of varying complexity.

Figure 16:
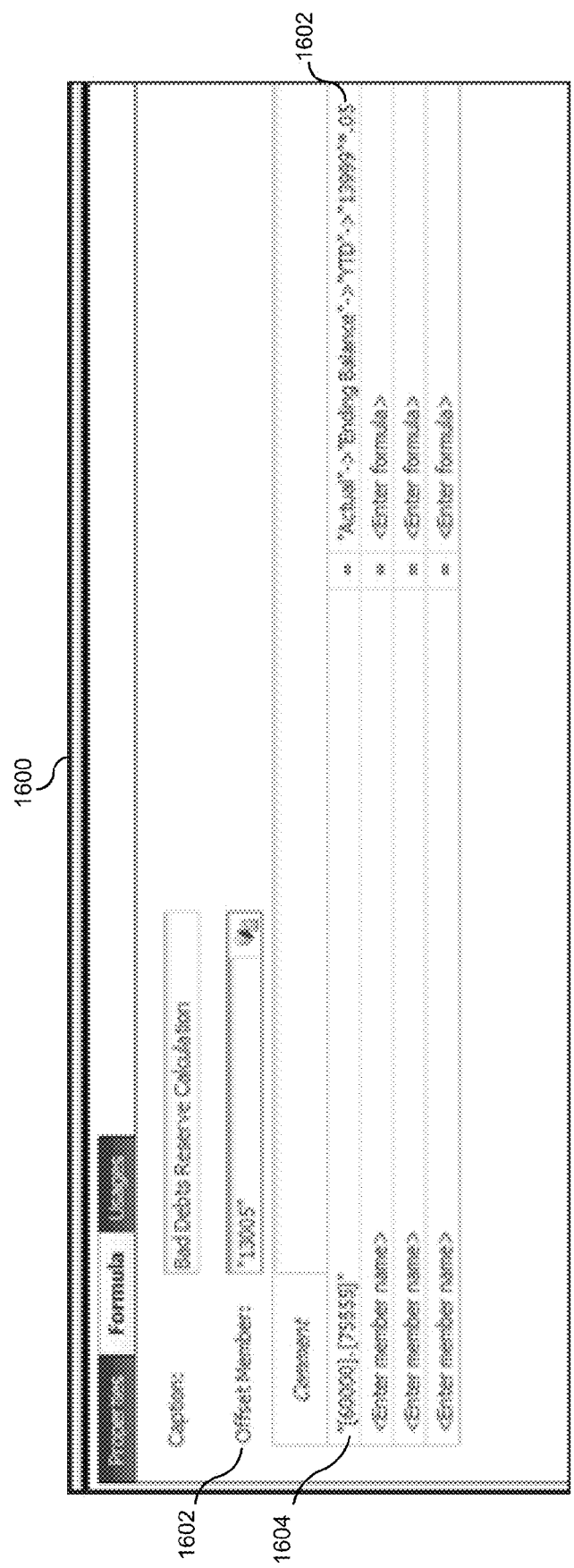
FIG. 16 illustrates an interface for defining a transfer formula, according to one embodiment.

FIG. 16 illustrates an interface 1600 for defining a transfer formula, according to one embodiment. Recall that a transfer formula may, inter alia, define how funds can be moved from one account to another account. The source account for the transfer may be referred to as the offset. In this example, a transfer is being made from account 1260 which is an allowance for bad debt account. Therefore, the formula rule needs to be defined to generate a journal entry crediting this account, and debiting a bad debt expense account. Interface 1600 also allows for member formulas 1602 to be entered that designate a source, target, and/or offset. Formulas involving members may be referred to also as a transfer rule. A transfer rule may involve choosing an account, a characteristic of that account, and a formula for driving an amount based on the characteristic. In this example, an account 1604 (account "75555") may be selected as the target account 1604 into which funds should be transferred. A formula 1602, or transfer rule, for the target account may also be received. In this example, the formula 1602 designates the source for the transfer to be 5% of the actual ending balance of account "13999" during the year-to-date accounting period. In order to balance out the accounting transfers in the respective journals, an offset 1606 designating the offset account of "13005" may be also be received. In this embodiment, the offset 1606 may be used for each transaction entered into interface 1600.

Figure 17:
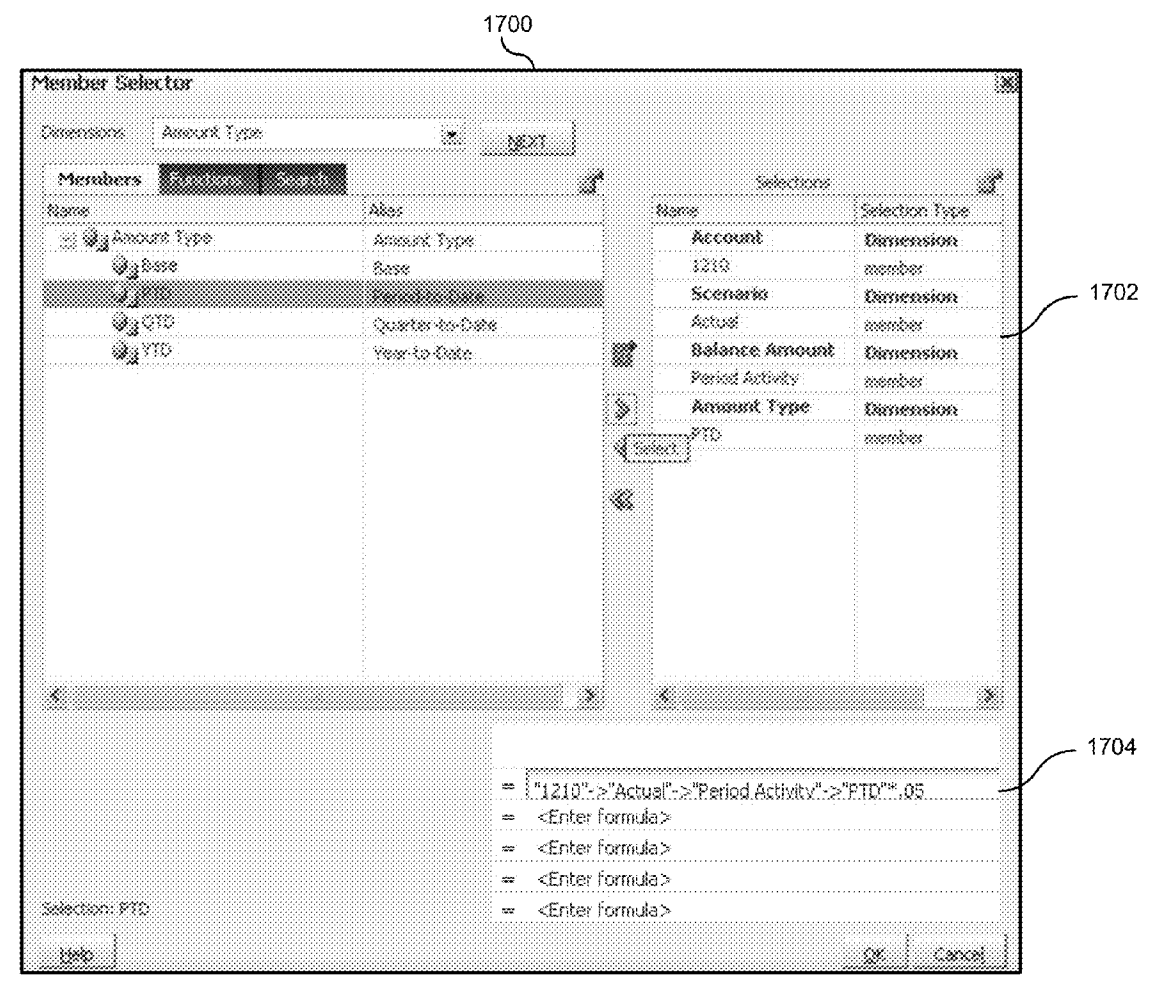

FIG. 17 illustrates an interface 1700 for selecting dimension members, according to one embodiment. In this example, dimension members 1702 may be selected to describe an account characteristic. Here, the account characteristic may be described as the actual activity of account 1210 during the current period. The account characteristic may be combined with other account characteristics, or with numerical expressions using arithmetic or logical operators. In this example the function may be defined by multiplying the account characteristic by a percentage value, such as "0.05". In other words, the transfer rule allocates a sum equal to 5% of the actual period activity of account 1210 during the current period. It will be understood that this transfer rule is merely exemplary, and not meant to be limiting. Transfer rules may be defined using any number of account dimensions and any number of numerical values that may be combined with any arithmetic or logical operators. Note that interface 1700 may be used to select dimension members to be used in any portion of both allocation rules and transfer formulas, in addition to selecting the specific source account of the transfer formula in FIG. 17.

Figure 18:
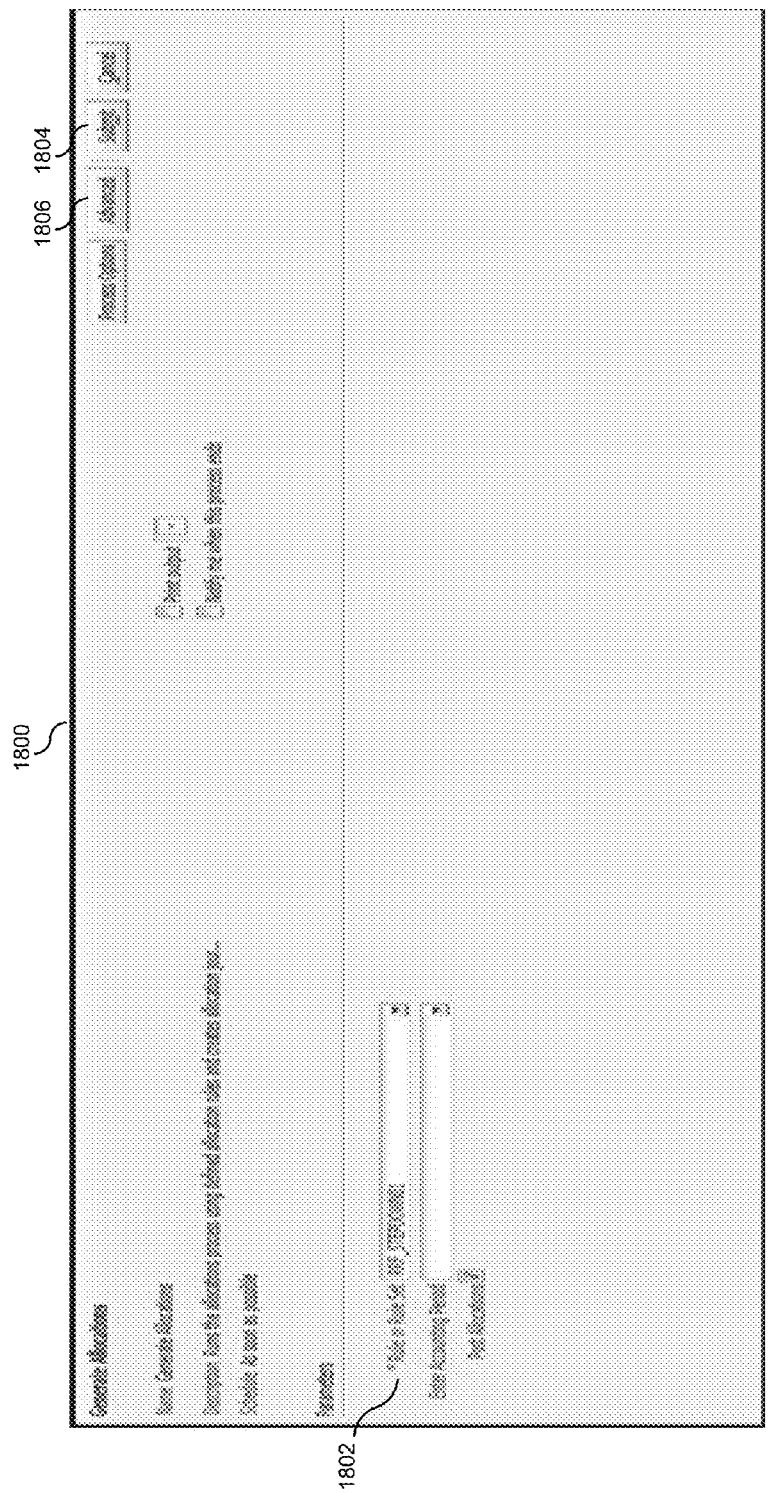
FIG. 18 illustrates an interface for scheduling and executing allocation rules and/or transfer formulas, according to one embodiment.

FIG. 18 illustrates an interface 1800 for scheduling and executing allocation rules and/or transfer formulas, according to one embodiment. A control 1802 may be used to select from available allocation rules and/or transfer formulas that may be provided based on previous definitions. In one embodiment, multiple allocation rules and/or transfer formulas may be selected from controls similar to control 1802 and scheduled to occur at some point in the future. In this particular interface, control 1804 marked as "Submit" may be used to immediately execute the allocation rule and/or transfer formula selected with control 1802. Alternatively or additionally, control 1806 marked as "Advanced" may be used to schedule the execution of the selected transfer formula and/or allocation rule at periodic future intervals. If they are scheduled to occur in the future, any RTP variables may be entered at this time. In other words, if a future process requires a value for an RTP variable, a prompt may appear allowing a user to define the variable with an input when the process is scheduled. In another embodiment, allocation rules and/or transfer formulas may be arranged hierarchically. Selecting or scheduling one entry may automatically select or schedule entries below the selection the hierarchy. For example, an allocation rule may be a parent to one or more child allocation rules. Scheduling the parent allocation rule to execute at a certain time may have the effect of automatically scheduling each of the one or more child allocation rules to execute at or around the same time. RTP variables entered for a parent allocation rule may similarly be applied to any child allocation rules in the hierarchy.

Once an allocation rule and/or transfer formula is executed, the results may be determined based on the methods and processes described above in this disclosure. For example, allocation rule may generate an input for a general ledger interface. The general ledger interface may generate journal entries that may be recorded in their respective journals, and the journal entries may be posted to the general ledger represented by a relational database. In turn, the relational database may update values in the multidimensional data cube, which may then update aggregated balances within its hierarchy.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of using rules to execute periodic allocations of funds in a hierarchal accounting structure, the method comprising:
receiving, by a computer system, an allocation rule, comprising:
a source account;
a rule for determining a first amount from the source account;
a parent account; and
an allocation basis that uses characteristics of one or more child accounts of the parent account to determine a proportion of the first amount to be allocated to the one or more child accounts;
populating, by the computer system, from one or more financial ledgers in a relational database system, at least a portion of a multidimensional data cube with data associated with the allocation rule, the multidimensional data cube comprising:
a hierarchal arrangement comprising at least the source account and the target account; and
aggregated balances for each level of the hierarchal arrangement;
generating, by the computer system, using data in the multidimensional data cube, an allocation scenario, wherein:
the allocation scenario queries the multidimensional data cube for the aggregated balances;
the allocation scenario executes the allocation rule by calculating the first amount and allocating the first amount to the aggregated balances for the one or more child accounts according to the allocation rule; and
the allocation scenario generates result values for each account affected by the allocation scenario;
generating, by the computer system, one or more accounting journal entries that update each account affected by the allocation scenario with the result values;
posting, by the computer system, the one or more accounting journal entries to the one or more financial ledgers in the relational database system; and
updating, by the computer system, the multidimensional data cube to reflect changes affecting the aggregated balances resulting from the one or more accounting journal entries posted to the one or more financial ledgers in the relational database system.

2. The method of claim 1 further comprising:
receiving a point-of-view comprising information about the allocation rule;
preparing a plurality of sequential interfaces, wherein each interface is configured to receive a portion of the allocation rule;
determining that a first portion of the allocation rule is defined by the point-of-view;
preventing a first interface in the plurality of sequential interfaces from being presented;
presenting the remaining interfaces in the plurality of sequential interfaces; and
receiving the remaining portions of the allocation rule from the remaining interfaces in the plurality of sequential interfaces.

3. The method of claim 1 wherein the allocation rule further comprises an exclusion list that prevents a subset of the one or more child accounts from receiving an allocation.

4. The method of claim 1 further comprising receiving a run-time-prompt variable definition that specifies a portion of the allocation rule that should be received at run time.

5. The method of claim 4 further comprising:
receiving, prior to generating the allocation scenario, a value for the run-time-prompt variable; and
using the value of the run-time prompt variable in the allocation rule.

6. The method of claim 1 further comprising:
generating the allocation scenario in the multidimensional data cube, wherein the allocation scenario is stored in a dedicated dimension in the multidimensional data cube; and
clearing data from the allocation scenario from the multidimensional data cube prior to posting the one or more journal entries.

7. The method of claim 1 further comprising:
generating the one of more accounting journal entries by importing data from the allocation scenario using a general ledger interface of an accounting system.

8. The method of claim 1 wherein the multidimensional data cube is updated automatically by posting data to the relational database.

9. The method of claim 1 further wherein the rule for determining the first amount from the source account comprises dividing the first amount between the one or more child accounts proportional to a salary amount assigned to each of the one or more child accounts.

10. A non-transitory computer-readable memory having stored thereon a sequence of instructions which, when executed by one or more processors, causes the one or more processors to execute periodic allocations of funds in a hierarchal accounting structure by:
receiving an allocation rule, comprising:
a source account;
a rule for determining a first amount from the source account;
a parent account; and
an allocation basis that uses characteristics of one or more child accounts of the parent account to determine a proportion of the first amount to be allocated to the one or more child accounts;
populating from one or more financial ledgers in a relational database system, at least a portion of a multidimensional data cube with data associated with the allocation rule, the multidimensional data cube comprising:
a hierarchal arrangement comprising at least the source account and the target account; and
aggregated balances for each level of the hierarchal arrangement;
generating, by the computer system, using data in the multidimensional data cube, an allocation scenario, wherein:
the allocation scenario queries the multidimensional data cube for the aggregated balances;
the allocation scenario executes the allocation rule by calculating the first amount and allocating the first amount to the aggregated balances for the one or more child accounts according to the allocation rule; and
the allocation scenario generates result values for each account affected by the allocation scenario;
generating one or more accounting journal entries that update each account affected by the allocation scenario with the result values;
posting the one or more accounting journal entries to the one or more financial ledgers in the relational database system; and
updating the multidimensional data cube to reflect changes affecting the aggregated balances resulting from the one or more accounting journal entries posted to the one or more financial ledgers in the relational database system.

11. The non-transitory computer-readable memory according to claim 10 wherein the instructions further cause the one or more processors to execute periodic allocations of funds in a hierarchal accounting structure by:
receiving a point-of-view comprising information about the allocation rule;
preparing a plurality of sequential interfaces, wherein each interface is configured to receive a portion of the allocation rule;
determining that a first portion of the allocation rule is defined by the point-of-view;
preventing a first interface in the plurality of sequential interfaces from being presented;
presenting the remaining interfaces in the plurality of sequential interfaces; and
receiving the remaining portions of the allocation rule from the remaining interfaces in the plurality of sequential interfaces.

12. The non-transitory computer-readable memory according to claim 10 wherein the allocation rule further comprises an exclusion list that prevents a subset of the one or more child accounts from receiving an allocation.

13. The non-transitory computer-readable memory according to claim 10 wherein the instructions further cause the one or more processors to execute periodic allocations of funds in a hierarchal accounting structure by:
receiving a run-time-prompt variable definition that specifies a portion of the allocation rule that should be received at run time;
receiving, prior to generating the allocation scenario, a value for the run-time-prompt variable; and
using the value of the run-time prompt variable in the allocation rule.

14. The non-transitory computer-readable memory according to claim 10 wherein the instructions further cause the one or more processors to execute periodic allocations of funds in a hierarchal accounting structure by:
generating the allocation scenario in the multidimensional data cube, wherein the allocation scenario is stored in a dedicated dimension in the multidimensional data cube;
clearing data from the allocation scenario from the multidimensional data cube prior to posting the one or more journal entries; and
generating the one of more accounting journal entries by importing data from the allocation scenario using a general ledger interface of an accounting system.

15. A system comprising:
a processor; and
a memory communicatively coupled with and readable by the processor and having stored therein a sequence of instructions which, when executed by the processor, cause the processor to execute periodic allocations of funds in a hierarchal accounting structure by:
receiving an allocation rule, comprising:
a source account;
a rule for determining a first amount from the source account;
a parent account; and
an allocation basis that uses characteristics of one or more child accounts of the parent account to determine a proportion of the first amount to be allocated to the one or more child accounts;
populating from one or more financial ledgers in a relational database system, at least a portion of a multidimensional data cube with data associated with the allocation rule, the multidimensional data cube comprising:
a hierarchal arrangement comprising at least the source account and the target account; and
aggregated balances for each level of the hierarchal arrangement;
generating, by the computer system, using data in the multidimensional data cube, an allocation scenario, wherein:
the allocation scenario queries the multidimensional data cube for the aggregated balances;
the allocation scenario executes the allocation rule by calculating the first amount and allocating the first amount to the aggregated balances for the one or more child accounts according to the allocation rule; and the allocation scenario generates result values for each account affected by the allocation scenario;

generating one or more accounting journal entries that update each account affected by the allocation scenario with the result values;

posting the one or more accounting journal entries to the one or more financial ledgers in the relational database system; and updating the multidimensional data cube to reflect changes affecting the aggregated balances resulting from the one or more accounting journal entries posted to the one or more financial ledgers in the relational database system.

16. The system of claim 15 wherein the multidimensional data cube is updated by posting data to the relational database.

17. The system of claim 15 wherein the rule for determining the first amount from the source account comprises dividing the first amount between the one or more child accounts proportional to a salary amount assigned to each of the one or more child accounts.

18. The system of claim 15 wherein the instructions further cause the processor to execute periodic allocations of funds in a hierarchal accounting structure by:

receiving a point-of-view comprising information about the allocation rule;

preparing a plurality of sequential interfaces, wherein each interface is configured to receive a portion of the allocation rule;

determining that a first portion of the allocation rule is defined by the point-of-view;

preventing a first interface in the plurality of sequential interfaces from being presented;

presenting the remaining interfaces in the plurality of sequential interfaces; and receiving the remaining portions of the allocation rule from the remaining interfaces in the plurality of sequential interfaces.

19. The system of claim 15 wherein the instructions further cause the processor to execute periodic allocations of funds in a hierarchal accounting structure by:

receiving a run-time-prompt variable definition that specifies a portion of the allocation rule that should be received at run time;

receiving, prior to generating the allocation scenario, a value for the run-time-prompt variable; and using the value of the run-time prompt variable in the allocation rule.

20. The system of claim 15 wherein the instructions further cause the processor to execute periodic allocations of funds in a hierarchal accounting structure by:

generating the allocation scenario in the multidimensional data cube, wherein the allocation scenario is stored in a dedicated dimension in the multidimensional data cube;

clearing data from the allocation scenario from the multidimensional data cube prior to posting the one or more journal entries; and generating the one of more accounting journal entries by importing data from the allocation scenario using a general ledger interface of an accounting system.

* * * * *

UNITED STATES PATENT AND TRADEMARK OFFICE
CERTIFICATE OF CORRECTION

PATENT NO. : 8,768,794 B2
APPLICATION NO. : 13/458110
DATED : July 1, 2014
INVENTOR(S) : Dhakephalkar et al.

It is certified that error appears in the above-identified patent and that said Letters Patent is hereby corrected as shown below:

In the Specification

In column 11, lines 42-43, delete "and or" and insert -- and/or --, therefor.

In the Claims

In column 21, line 2, in Claim 7, delete "one of more" and insert -- one or more --, therefor.

In column 22, line 33, in Claim 14, delete "one of more" and insert -- one or more --, therefor.

In column 24, line 28, in Claim 20, delete "one of more" and insert -- one or more --, therefor.

Signed and Sealed this
Third Day of March, 2015

Michelle K. Lee
*Deputy Director of the United States Patent and Trademark Office*